United States Patent
Shinotsuka et al.

(10) Patent No.: US 9,955,259 B2
(45) Date of Patent: Apr. 24, 2018

(54) TRANSMITTER AND POSITION INFORMATION MANAGEMENT SYSTEM

(71) Applicants: Michiaki Shinotsuka, Kanagawa (JP);
Tsutomu Kawase, Kanagawa (JP);
Takaya Ochiai, Kanagawa (JP);
Takashi Saito, Kanagawa (JP)

(72) Inventors: Michiaki Shinotsuka, Kanagawa (JP);
Tsutomu Kawase, Kanagawa (JP);
Takaya Ochiai, Kanagawa (JP);
Takashi Saito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/228,076

(22) Filed: Aug. 4, 2016

(65) Prior Publication Data
US 2017/0048618 A1    Feb. 16, 2017

(30) Foreign Application Priority Data
Aug. 10, 2015 (JP) ................. 2015-158527

(51) Int. Cl.
*H04R 3/12* (2006.01)
*G01S 1/68* (2006.01)
(Continued)

(52) U.S. Cl.
CPC ............ *H04R 3/12* (2013.01); *G01S 1/68* (2013.01); *G01S 1/725* (2013.01); *G01S 1/74* (2013.01);
(Continued)

(58) Field of Classification Search
CPC .......... H04R 3/12; H04R 1/323; H04R 27/00; H04R 29/001; H04R 2201/025;
(Continued)

(56) References Cited

U.S. PATENT DOCUMENTS

| | | | |
|---|---|---|---|
| 8,867,313 B1* | 10/2014 | Rivlin | G01S 5/30 367/118 |
| 2007/0092091 A1* | 4/2007 | Noro | H04R 1/2834 381/111 |

(Continued)

FOREIGN PATENT DOCUMENTS

| | | |
|---|---|---|
| EP | 2902795 | 8/2015 |
| JP | 2010-117301 | 5/2010 |

(Continued)

OTHER PUBLICATIONS

Extended European Search Report dated Dec. 21, 2016.

*Primary Examiner* — Sonia Gay
(74) *Attorney, Agent, or Firm* — IPUSA, PLLC

(57) ABSTRACT

A transmitter is provided that is capable of communicating with a management apparatus via a network and is configured to output a plurality of sound waves in a plurality of different directions. The transmitter includes a memory storing a program, and a processor configured to execute the program to implement processes of outputting a first sound wave including first unique information in a first output direction of the plurality of different directions, outputting a second sound wave including second unique information that differs from the first unique information in a second output direction that differs from the first output direction, and individually controlling the first sound wave output by the first sound wave output unit and the second sound wave output by the second sound wave output unit based on a request from the management apparatus.

16 Claims, 33 Drawing Sheets

(51) Int. Cl.

| | | |
|---|---|---|
| *G01S 1/72* | (2006.01) | |
| *G01S 1/74* | (2006.01) | |
| *G06F 3/16* | (2006.01) | |
| *H04R 1/32* | (2006.01) | |
| *H04R 27/00* | (2006.01) | |
| *H04W 4/00* | (2009.01) | |
| *G01S 1/78* | (2006.01) | |
| *H04R 29/00* | (2006.01) | |

(52) U.S. Cl.
CPC ............ *G06F 3/165* (2013.01); *H04R 1/323* (2013.01); *H04R 27/00* (2013.01); *H04R 29/001* (2013.01); *H04W 4/008* (2013.01); *G01S 1/78* (2013.01); *H04R 2201/025* (2013.01); *H04R 2410/05* (2013.01); *H04R 2420/07* (2013.01); *H04R 2430/01* (2013.01)

(58) Field of Classification Search
CPC ............ H04R 2410/05; H04R 2420/07; H04R 2430/01; G01S 1/68; G01S 1/725; G01S 1/74; G01S 1/78; G06F 3/165; H04W 4/008

See application file for complete search history.

(56) References Cited

U.S. PATENT DOCUMENTS

| | | | |
|---|---|---|---|
| 2008/0219458 A1* | 9/2008 | Brooks | H03G 3/32 381/57 |
| 2010/0008512 A1* | 1/2010 | Packer | H04R 27/00 381/57 |
| 2010/0158287 A1* | 6/2010 | Xu | H04R 1/028 381/300 |
| 2013/0279300 A1 | 10/2013 | Iwase et al. | |
| 2014/0285338 A1* | 9/2014 | Davis | H04W 4/023 340/539.13 |
| 2015/0117160 A1* | 4/2015 | Sakurada | G01S 1/68 367/197 |
| 2015/0156637 A1* | 6/2015 | Li | G01S 1/725 455/454 |
| 2016/0026427 A1* | 1/2016 | Kuper | G06F 3/16 700/94 |
| 2016/0309258 A1* | 10/2016 | Hiscock | H04R 5/04 |

FOREIGN PATENT DOCUMENTS

| | | |
|---|---|---|
| JP | 2012-227909 | 11/2012 |
| JP | 2013-106278 | 5/2013 |
| WO | 2014/175745 | 10/2014 |

\* cited by examiner

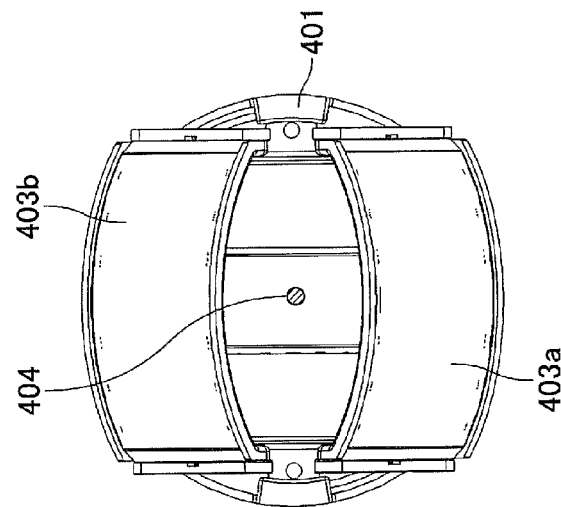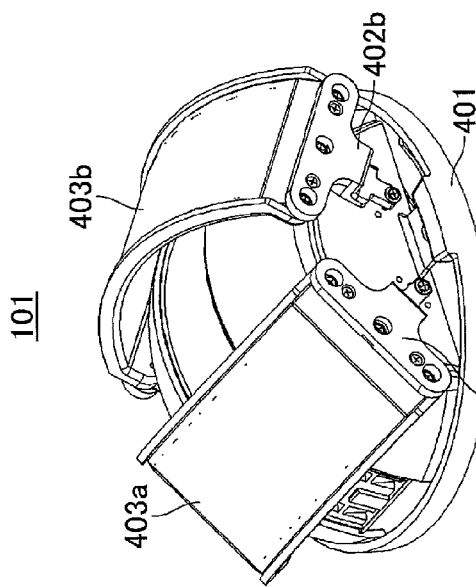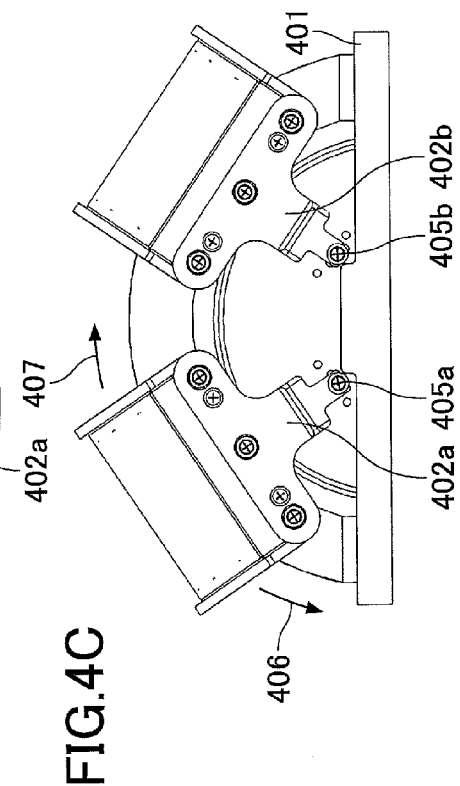
FIG.4B
FIG.4A
FIG.4C

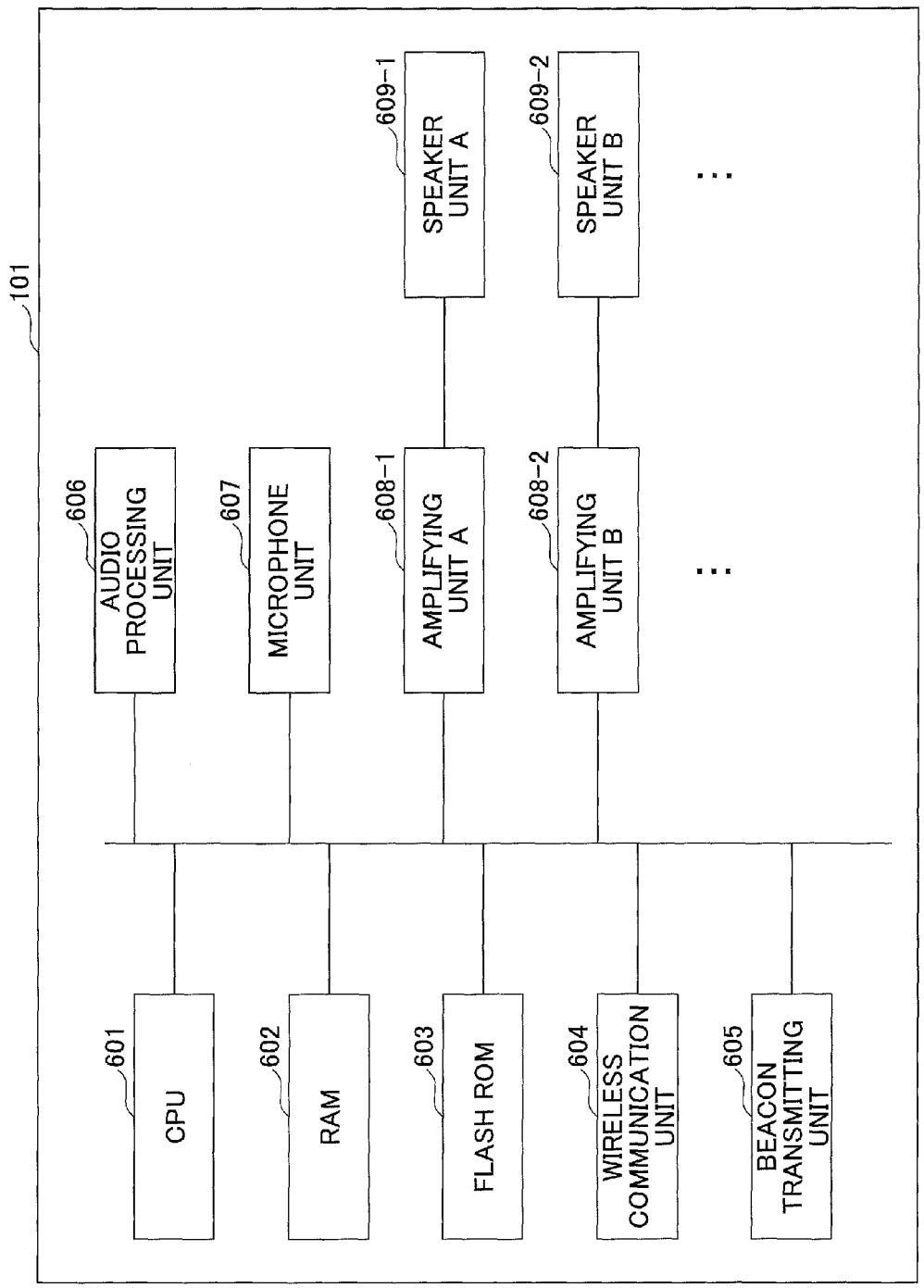

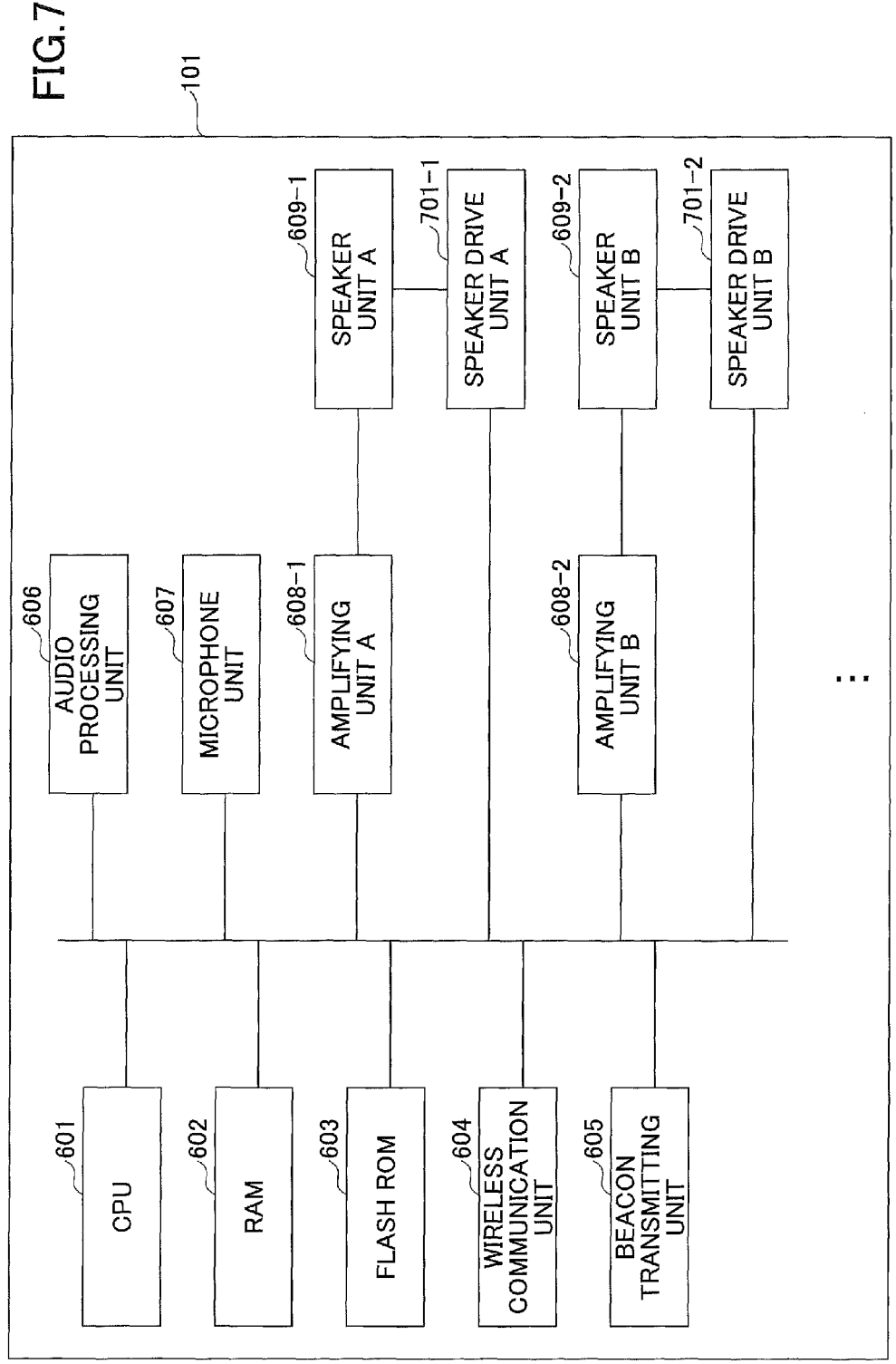

FIG.14A

| TRANSMITTER ID | SPEAKER ID | DIRECTION | ANGLE (VERTICAL) | POSITION COORDINATES | POSITION DESCRIPTION | ... |
|---|---|---|---|---|---|---|
| ID0001 | SP0001N | N | 45° | (x0001, y0001) | FIRST PASSAGE NORTHERN END | ... |
| | SP0001S | S | 40° | | | ... |
| ID0002 | SP0002N | N | 50° | (x0002, y0001) | FIRST PASSAGE CENTER | ... |
| | SP0002S | S | 45° | | | ... |
| ID0003 | SP0003N | N | 45° | (x0003, y0001) | FIRST PASSAGE SOUTHERN END | ... |
| | SP0003S | S | 45° | | | ... |
| ... | ... | ... | ... | ... | ... | ... |

FIG.14B

| TRANSMITTER ID | SPEAKER ID | DIRECTION | ANGLE (VERTICAL) | POSITION COORDINATES | POSITION DESCRIPTION |
|---|---|---|---|---|---|
| ID0001 | SP0001N | N | 45° | (x0001, y0001, z0001) | 1F FIRST PASSAGE NORTHERN END |
| | SP0001S | S | 40° | | |
| ID0002 | SP0002N | N | 50° | (x0002, y0001, z0001) | 1F FIRST PASSAGE CENTER |
| | SP0002S | S | 45° | | |
| ID0003 | SP0003N | N | 45° | (x0003, y0001, z0001) | 1F FIRST PASSAGE SOUTHERN END |
| | SP0003S | S | 45° | | |
| ID0004 | SP0004N | N | 45° | (x0001, y0001, z0002) | 2F FIRST PASSAGE NORTHERN END |
| | SP0004S | S | 45° | | |
| ... | ... | ... | ... | ... | ... |
| ID0007 | SP0007N | N | 50° | (x0002, y0002, −z0001) | B1F FLOOR CENTER |
| | SP0007S | S | 55° | | |
| ... | ... | ... | ... | ... | ... |

FIG.14C

| INFORMATION TERMINAL ID | TRANSMITTER ID | SPEAKER ID | ACQUISITION DATE/TIME | POSITION COORDINATES | DIRECTION |
|---|---|---|---|---|---|
| AP0001 | ID0001 | SP0001S | 20xx/4/3 10:00 | (x0001, y0001, z0001) | S |
| AP0002 | ID0004 | SP0004N | 20xx/4/3 9:59 | (x0001, y0001, z0002) | N |
| AP0003 | ID0002 | – | 20xx/4/3 10:05 | (x0002, y0001, z0001) | – |
| ... | ... | ... | ... | ... | ... |

FIG.15

| AMBIENT NOISE LEVEL (1-10) | OUTPUT LEVEL CORRECTION VALUE | OUTPUT SOUND PRESSURE LEVEL (ESTIMATE) |
|---|---|---|
| 1 | −3 dB | LEVEL 001 |
| 2 | −2 dB | LEVEL 002 |
| 3 | −1 dB | LEVEL 003 |
| 4 | 0 | LEVEL 004 |
| 5 | +1 dB | LEVEL 005 |
| 6 | +2 dB | LEVEL 006 |
| 7 | +3 dB | LEVEL 007 |
| 8 | +4 dB | LEVEL 008 |
| 9 | +5 dB | LEVEL 009 |
| 10 | +6 dB | LEVEL 010 |

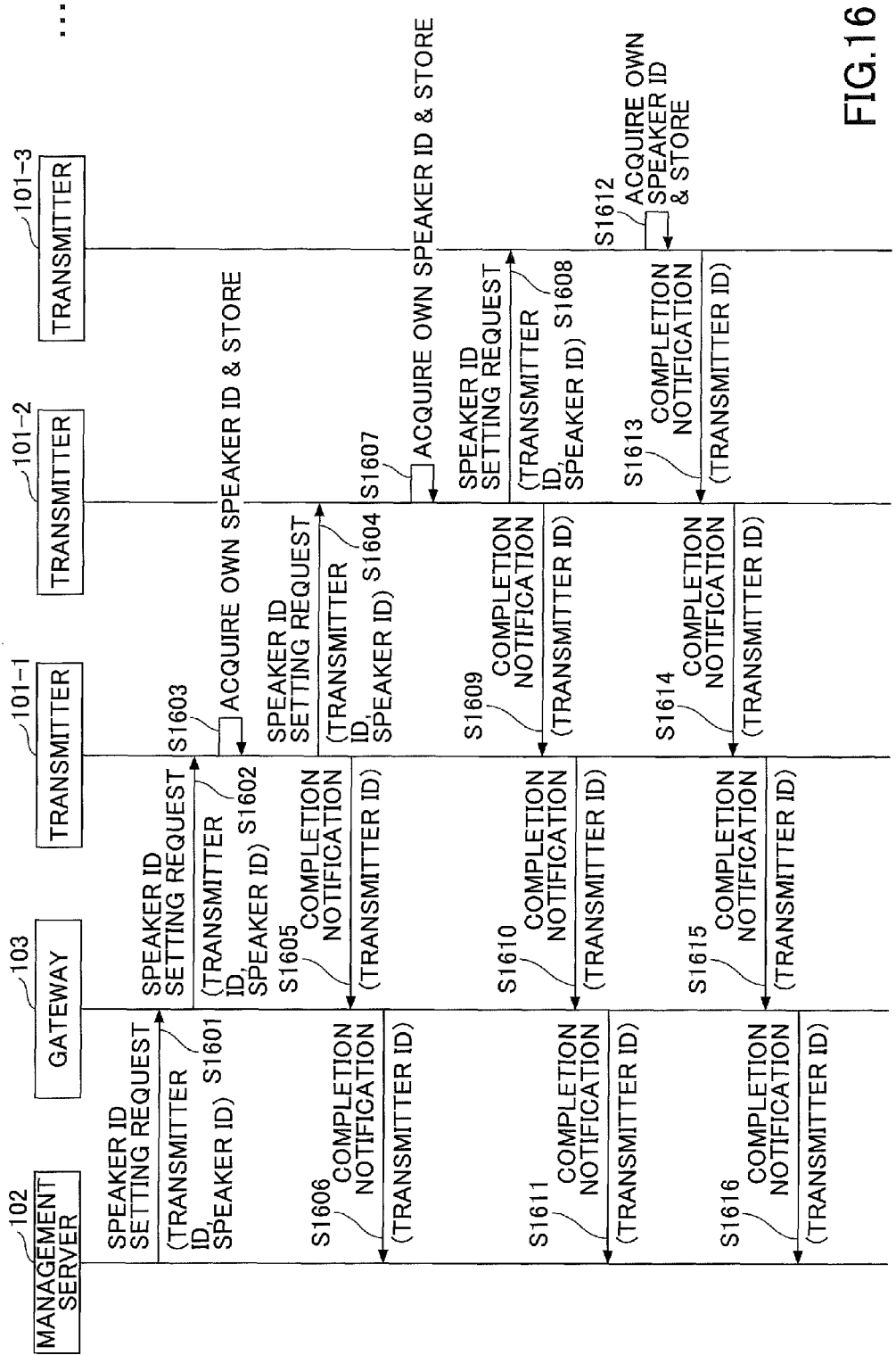

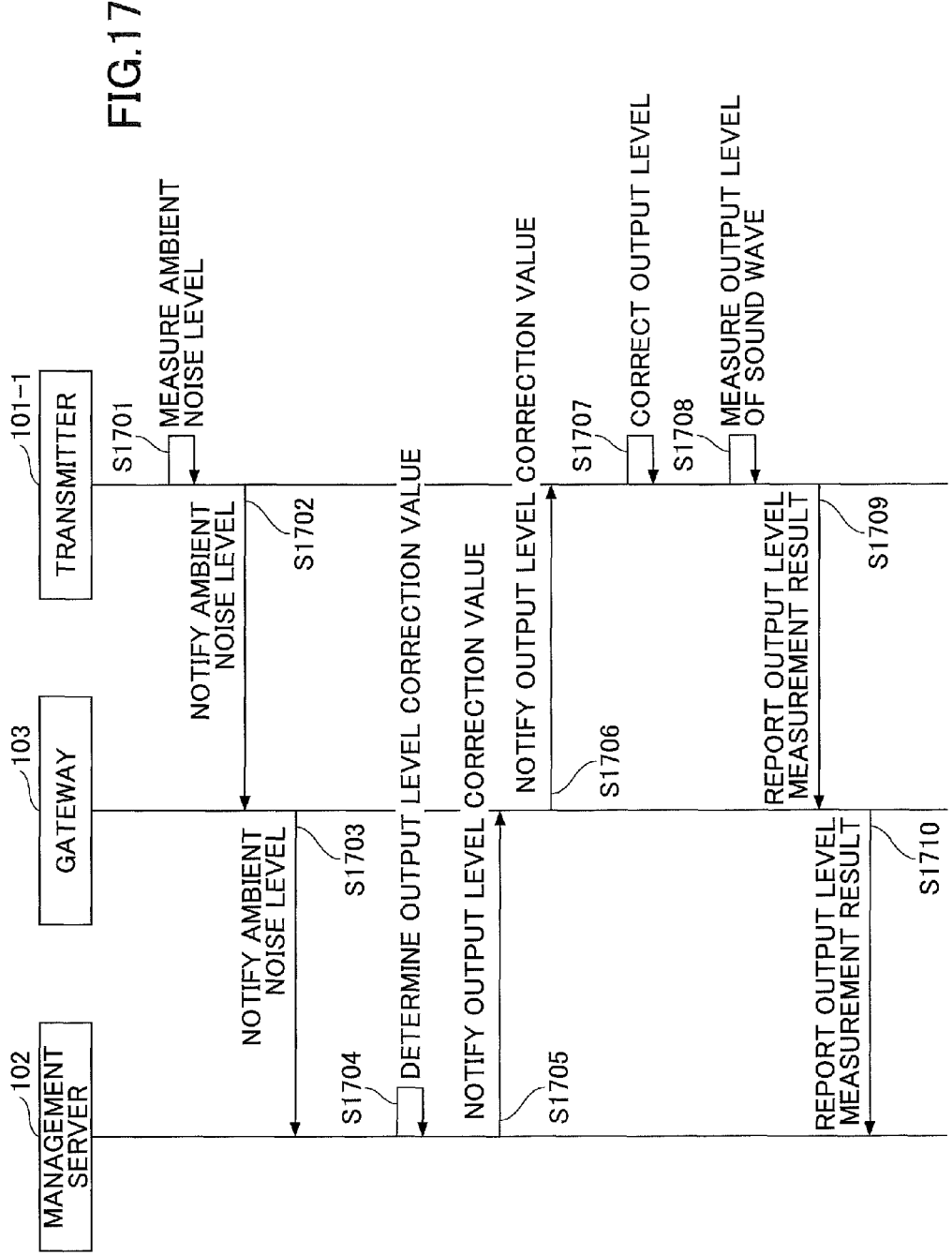

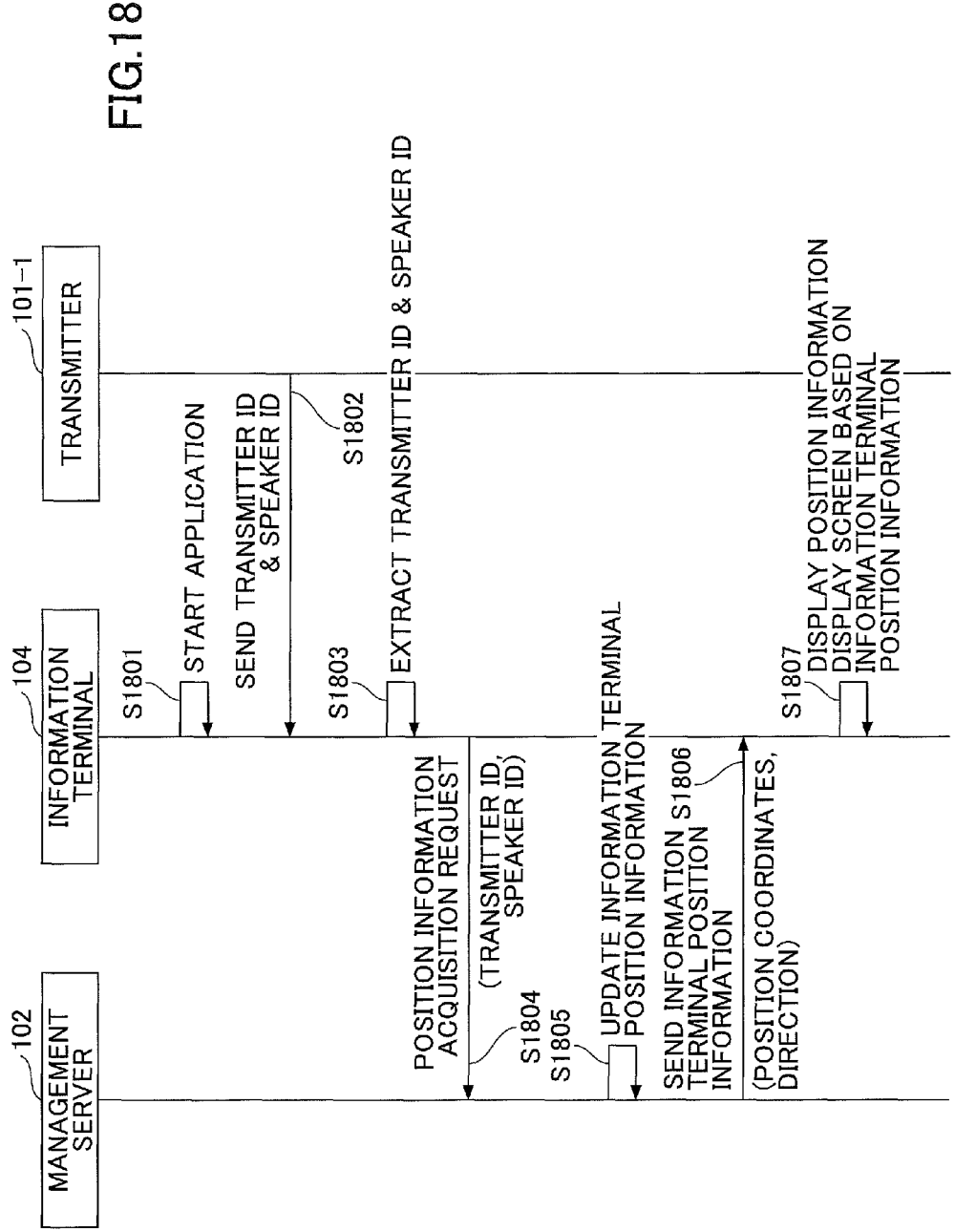

FIG.23A

| TRANSMITTER ID | SPEAKER ID | DIRECTION (ANGLE) | ANGLE (VERTICAL) | POSITION COORDINATES | POSITION DESCRIPTION |
|---|---|---|---|---|---|
| ID0001 | SP0001N | 0.5° | 45° | (x0001, y0001, z0001) | 1F FIRST PASSAGE NORTHERN END |
|  | SP0001S | 180.5° | 40° |  |  |
| ID0002 | SP0002N | 11° | 50° | (x0002, y0001, z0001) | 1F FIRST PASSAGE CENTER |
|  | SP0002S | 191° | 45° |  |  |
| ID0003 | SP0003N | 22° | 45° | (x0003, y0001, z0001) | 1F FIRST PASSAGE SOUTHERN END |
|  | SP0003S | 202° | 45° |  |  |
| ID0004 | SP0004N | 7.5° | 45° | (x0001, y0001, z0002) | 2F FIRST PASSAGE NORTHERN END |
|  | SP0004S | 187.5° | 45° |  |  |
| ... | ... | ... | ... | ... | ... |
| ID0007 | SP0007N | 1° | 50° | (x0002, y0002, −z0001) | B1F FLOOR CENTER |
|  | SP0007S | 181° | 55° |  |  |
| ... | ... | ... | ... | ... | ... |

FIG.23B

| INFORMATION TERMINAL ID | TRANSMITTER ID | SPEAKER ID | ACQUISITION DATE/TIME | POSITION COORDINATES | DIRECTION |
|---|---|---|---|---|---|
| AP0001 | ID0001 | SP0001S | 20xx/4/3 10:00 | (x0001, y0001, z0001) | 180.5° |
| AP0002 | ID0004 | SP0004N | 20xx/4/3 9:59 | (x0001, y0001, z0002) | 7.5° |
| AP0003 | ID0002 | – | 20xx/4/3 10:05 | (x0002, y0001, z0001) | – |
| ⋮ | ⋮ | ⋮ | ⋮ | ⋮ | ⋮ |

FIG.25A

| EXTRACTED SPEAKER ID | REGION |
|---|---|
| SP0001N | REGION 1 |
| SP0001N SP0001S | REGION 2 |
| SP0001S | REGION 3 |
| SP0001S SP0002N | REGION 4 |
| SP0002N | REGION 5 |
| SP0002N SP0002S | REGION 6 |
| SP0002S | REGION 7 |
| SP0002S SP0003N | REGION 8 |
| SP0003N | REGION 9 |
| SP0003N SP0003S | REGION 10 |
| SP0003S | REGION 11 |

FIG.25B

| INFORMATION TERMINAL ID | SPEAKER ID | ACQUISITION DATE/TIME | REGION |
|---|---|---|---|
| AP0001 | SP0001N SP0001S | 20xx/4/3 10:00 | REGION 2 |
| AP0002 | SP0002N | 20xx/4/3 9:59 | REGION 5 |
| AP0003 | SP0003N SP0003S | 20xx/4/3 10:05 | REGION 10 |
| ... | ... | ... | ... |

FIG.28

| | RECEIVED SIGNAL | | CURRENT POSITION | PROCESS | NEXT DIRECTION |
|---|---|---|---|---|---|
| | SOUND WAVE | BEACON | | | |
| START | ZONE 9-S | ZONE 9-H | ZONE 9-S | SET UP (ZONE 1-N) AS DESTINATION | – |
| STEP A | ZONE 9-S | ZONE 9-H | ZONE 9-S | GUIDE TO ADJACENT ZONE (ZONE 9-N) CLOSER TO DESTINATION | NORTH |
| STEP B | ZONE 9-N | ZONE 9-H | ZONE 9-N | GUIDE TO ADJACENT ZONE (ZONE 8-N) CLOSER TO DESTINATION | WEST |
| STEP C | ZONE 8-N | ZONE 8-H | ZONE 8-N | GUIDE TO ADJACENT ZONE (ZONE 5-S) CLOSER TO DESTINATION | NORTH |
| STEP D | ZONE 5-S | ZONE 5-H | ZONE 5-S | GUIDE TO ADJACENT ZONE (ZONE 5-N) CLOSER TO DESTINATION | NORTH |
| STEP E | ZONE 5-N | ZONE 5-H | ZONE 5-N | GUIDE TO ADJACENT ZONE (ZONE 4-N) CLOSER TO DESTINATION | WEST |
| STEP F | ZONE 4-N | ZONE 4-H | ZONE 4-N | GUIDE TO ADJACENT ZONE (ZONE 1-S) CLOSER TO DESTINATION | NORTH |
| STEP G | ZONE 1-S | ZONE 1-H | ZONE 1-S | GUIDE TO ADJACENT ZONE (ZONE 1-N) CLOSER TO DESTINATION | NORTH |
| STEP H | ZONE 1-N | ZONE 1-H | ZONE 1-N | NOTIFY THAT DESTINATION HAS BEEN REACHED | – |

TRANSMITTER AND POSITION INFORMATION MANAGEMENT SYSTEM

CROSS-REFERENCE TO RELATED APPLICATIONS

The present application claims priority under 35 U.S.C. § 119 to Japanese Patent Application No. 2015-158527 filed on Aug. 10, 2015, the entire contents of which are incorporated herein by reference.

BACKGROUND OF THE INVENTION

1. Field of the Invention

The present invention relates to a transmitter and a position information management system.

2. Description of the Related Art

Information providing systems that are capable of displaying various types of information on a portable terminal device such as a smartphone using audio are known (e.g., see Japanese Unexamined Patent Publication No. 2012-227909).

Also, visible light communication navigation systems that enable a receiving terminal to provide route guidance information by receiving data transmitted from a lighting apparatus with visible light communication functions are known (e.g., see Japanese Unexamined Patent Publication No. 2010-117301).

In configuring a position information management system for providing position information to an information terminal that is located indoors or in an underground city, for example, existing lighting apparatuses may be used to install transmitters for outputting position information. In this way, costs for installing power supply wiring may be reduced, for example.

SUMMARY OF THE INVENTION

According to an embodiment of the present invention, a transmitter is provided that is capable of communicating with a management apparatus via a network and is configured to output a plurality of sound waves in a plurality of different directions. The transmitter includes a memory storing a program, and a processor configured to execute the program to implement processes of outputting a first sound wave including first unique information in a first output direction of the plurality of different directions, outputting a second sound wave including second unique information that differs from the first unique information in a second output direction that differs from the first output direction, and individually controlling the first sound wave output by the first sound wave output unit and the second sound wave output by the second sound wave output unit based on a request from the management apparatus.

BRIEF DESCRIPTION OF THE DRAWINGS

FIGS. 4A-4C are diagrams illustrating example external views of a transmitter according to an embodiment of the present invention;

FIG. 6 is a block diagram illustrating an example hardware configuration of the transmitter according to an embodiment of the present invention;

FIG. 7 is a block diagram illustrating another example hardware configuration of the transmitter according to an embodiment of the present invention;

FIGS. 14A-14C are tables illustrating examples of position information managed by a position information management unit according to an embodiment of the present invention;

FIG. 15 is a table illustrating an example of speaker control information managed by a speaker control unit according to an embodiment of the present invention;

FIG. 16 is a sequence chart illustrating an example sequence of a speaker ID setting process according to an embodiment of the present invention;

FIG. 17 is a sequence chart illustrating an example sequence of a speaker output level control process according to an embodiment of the present invention;

FIG. 18 is a sequence chart illustrating an example sequence of a position information providing process according to an embodiment of the present invention;

FIGS. 23A and 23B are tables illustrating other examples of position information managed by the position information managing unit according to an embodiment of the present invention;

FIGS. 25A and 25B are tables illustrating other examples of position information managed by the position information management unit according to an embodiment of the present invention;

FIG. 28 is a table illustrating an example of route guidance according to an embodiment of the present invention;

DESCRIPTION OF THE EMBODIMENTS

In the following, embodiments of the present invention are described with reference to the accompanying drawings.

<System Configuration>

Figure 1:
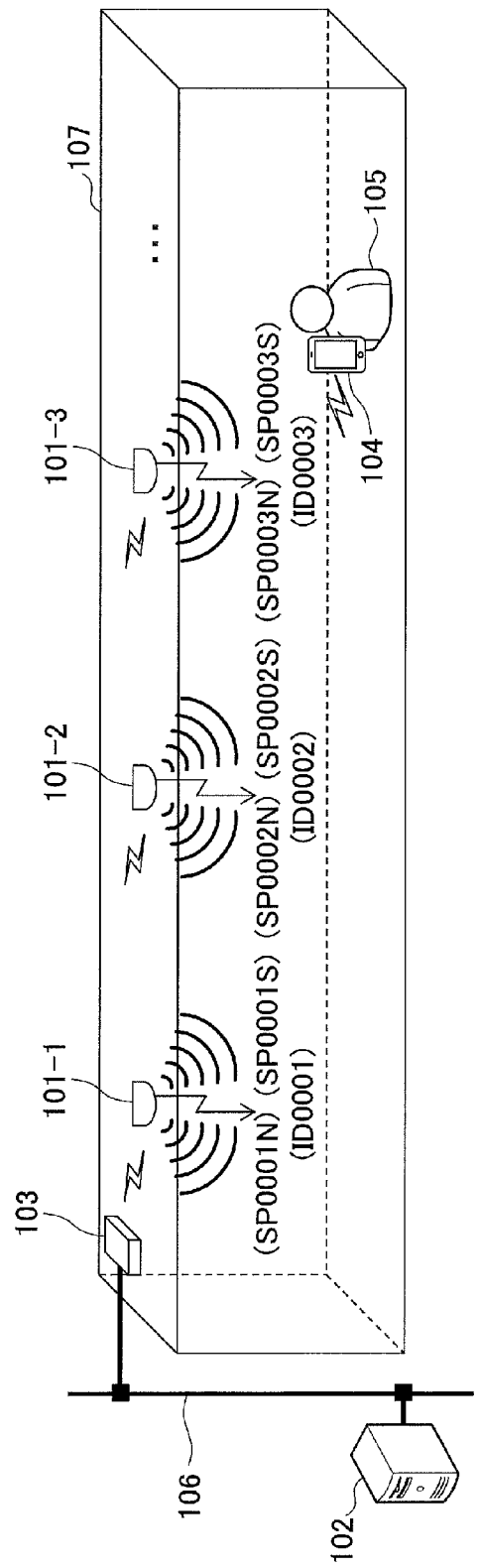
FIG. 1 is a diagram illustrating an example configuration of a position information management system according to an embodiment of the present invention.

FIG. 1 is a diagram illustrating an example configuration of a position information management system 100 according to an embodiment of the present invention. The position information management system 100 includes a plurality of transmitters 101-1, 101-2, and 101-3, a management server (management apparatus) 102, a gateway 103, and an information terminal 104, for example. Note that in the following descriptions, a given transmitter of the plurality of transmitters 101-1, 101-2, and 101-3 may generically be referred to as "transmitter 101". Also, note that the number of transmitters 101, the number of gateways 103, and the number of information terminals 104 included in the position information management system 100 may vary, and FIG. 1 merely illustrates one example.

The plurality of transmitters 101 may be installed at different locations on the ceiling of a building 107, for example. Each transmitter 101 is configured to output a signal including unique information of the transmitter 101 to a different region. The unique information may be identification information of the transmitter 101 or position information of the transmitter 101, for example. Also, the plurality of transmitters 101 are configured to form a predetermined wireless network with the gateway 103 so that they may be able to communicate with the management server 102 via the gateway 103.

In the example of FIG. 1, the transmitter 101-1 has two speakers, including a first speaker (first sound wave output unit) and a second speaker (second sound wave output unit). The first speaker outputs a sound wave including identification information "SP0001N" corresponding to identification information (unique information) of the first speaker to a first region. The second speaker outputs a sound wave including identification information "SP0001S" corresponding to identification information (unique information) of the second speaker to a second region, which is different from the first region.

In a preferred embodiment, the transmitter 101-1 includes a radio transmitter that outputs a radio wave (hereinafter referred to as "beacon") including identification information "ID0001" corresponding to identification information (unique information) of the transmitter 101-1 to a third region, which includes the first region and the second region.

Figure 2:
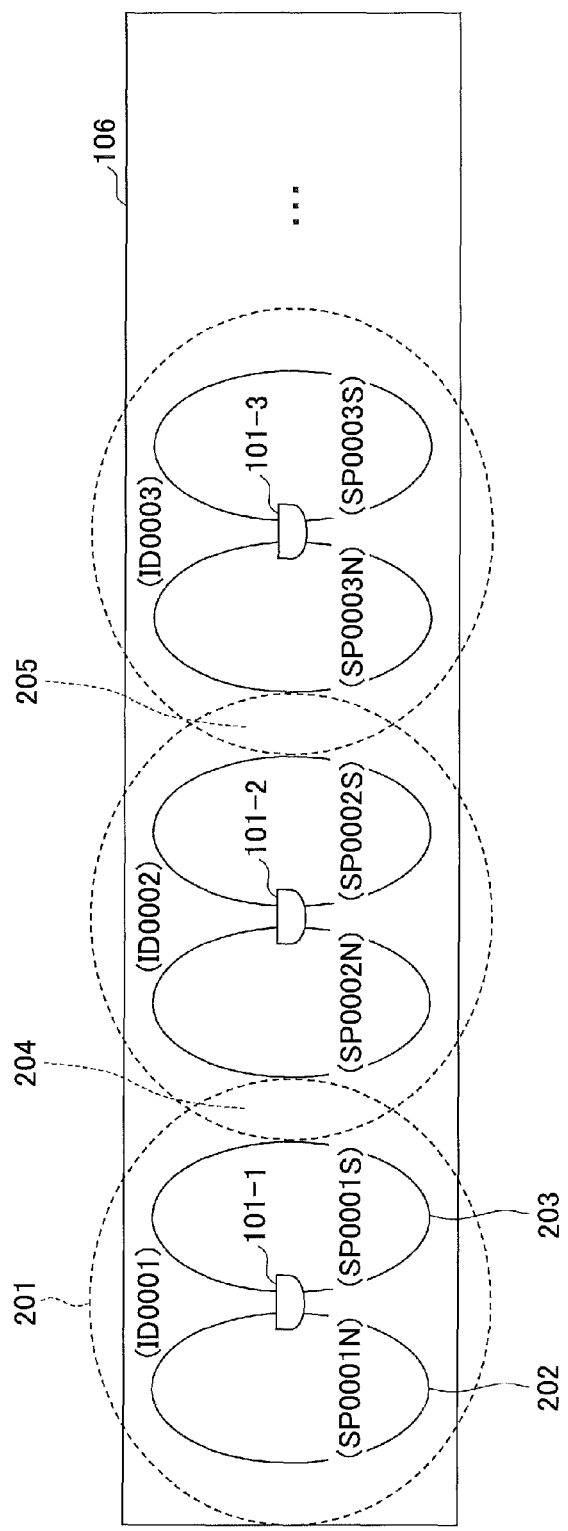
FIG. 2 is a diagram illustrating an example arrangement of a plurality of regions according to an embodiment of the present invention.

FIG. 2 illustrates an example arrangement of the first through third regions. FIG. 2 is a diagram illustrating an example arrangement of a plurality of regions according to an embodiment of the present invention. FIG. 2 is a top view of the building 107 illustrated in FIG. 1. In FIG. 2, the first speaker of the transmitter 101-1 outputs a sound wave including the identification information "SP0001N" of the first speaker (hereinafter referred to as "speaker ID") to the first region 202. Also, the second speaker outputs a sound wave including the speaker ID "SP0001S" of the second speaker to the second region 203. Further, the radio transmitter of transmitter 101-1 outputs a radio wave including the identification information "ID0001" of the transmitter 101-1 (hereinafter referred to as "transmitter ID") to the third region 201, which includes the first region 202 and the second region 203.

Note that the other transmitters 101-2 and 101-3 illustrated in FIG. 2 similarly output sound waves including speaker IDs and radio waves including transmitter IDs in the manner described above with respect to the transmitter 101-1.

Referring back to FIG. 1, the other components of the position information management system 100 are described below.

The management server 102 may be an information processing apparatus such as a PC (personal computer) that is connected to a network 106, such as the Internet or a LAN (Local Area Network), and is configured to execute an application (app) for implementing the functions of the management server 102 of the position information management system 100 according to the present embodiment, for example. Note that in some embodiments, the management server 102 may be configured by a plurality of information processing apparatuses, for example. The management server 102 is capable of communicating with the plurality of transmitters 101 via the network 106, and is configured to manage position information, such as the installation positions of the plurality of transmitters 101 and the position of the information terminal 104, for example. Also, the management server 102 performs various control operations with respect to the transmitters 101, such as controlling the speaker IDs output by each transmitter 101 and controlling the output level of the sound wave output by each transmitter 101, for example.

The gateway 103 is connected to the management server 102 via the network 106. The gateway 103 forms a wireless network with the plurality of transmitters 101. The gateway 103 routes data to be exchanged between the management server 102 and the transmitters 101 that are connected to the wireless network provided by the gateway 103.

The information terminal 104 may be a terminal device, such as a smartphone, a mobile phone, or a tablet terminal, that is carried by a user 105, for example. The information terminal 104 is capable of establishing connection with the network 106 through wireless communication to communicate with the management server 102. Also, the information terminal 104 executes an application program (hereinafter referred to as "app") for implementing the functions of the information terminal 104 of the information processing system 100 according to the present embodiment, for example.

By executing the app for the information terminal 104, the information terminal 104 acquires a sound wave output by the transmitter 101 using an internal microphone, for example, and extracts a speaker ID included in the acquired sound wave.

In a preferred embodiment, the information terminal 104 receives a beacon output by the transmitter 101 using the radio transmitter, and extracts a transmitter ID included in the received beacon, for example.

Also, the app for the information terminal 104 includes unique identification information (hereinafter referred to as "app ID") identifying each individual app installed in the information terminal 14. Once the information terminal 104 executes the app and extracts the speaker ID and the transmitter ID of the transmitter 101 from the received sound wave and beacon, the information terminal 104 transmits information including the extracted speaker ID and transmitter ID of the transmitter 101 and the app ID of the app that is run on the information terminal 104 to the management server 102.

Note that the app ID is an example of sender identification information that identifies the information terminal 104, the user of the information terminal 104, or the app that is run on the information terminal 104. By using the app ID, the information processing system 100 may be able to identify the information terminal 104 or the app without referring to personal information, such as a phone number of the information terminal 104 or an email address of the user, for example. Note, however, that the app ID is merely one example of sender identification information that may be used to identify an information terminal 104, a user, or an app, and in other examples, identification information of the information terminal 104 or identification information of the user 105 using the information terminal 104 may be used.

In the above system configuration, the management server 102 manages position information of the plurality of transmitters 101, and the speaker ID and the transmitter ID to be output by each of the transmitters 101. For example, the management server 102 may control (change) the speaker ID output by each of the speakers of the transmitter 101, and/or control (change) the output level of the sound wave output by each of the speakers.

Also, when the management server 102 receives information, such as an app ID, a speaker ID, and a transmitter ID from the information terminal 104, the management server 102 may determine the position of the information terminal 104 based on position information of the transmitter 101 stored in advance, and manage such position information of the information terminal 104.

For example, referring to FIG. 2, when the management server 102 receives information including the app ID of the app run on the information terminal 104, the speaker ID "SP0001N", and the transmitter ID "ID0001" from the information terminal 104, the management server 102 may determine that the information terminal 104 is located in the first region 202.

Also, when the management server 102 receives information including only the app ID of the app run on the information terminal 104 and the transmitter ID "ID0001" from the information terminal 104, the management server 102 may determine that the information terminal 104 is located somewhere within the third region 201.

Note that the plurality of regions based on the speaker IDs and the transmitter ID of the transmitter 101 may include overlapping regions, such as regions 204 and 205 as illustrated in FIG. 2, for example. In this case, when the management server 102 receives information including the app ID of the app run on the information terminal 104 and the terminal IDs "ID001" and "ID002", for example, the management server 102 may determine that the information terminal 104 is located within region 204.

Note that although the transmitter 101 is described as outputting two sound waves in the above example, the transmitter 101 may be configured to output any plural number of sound waves.

Figure 3:
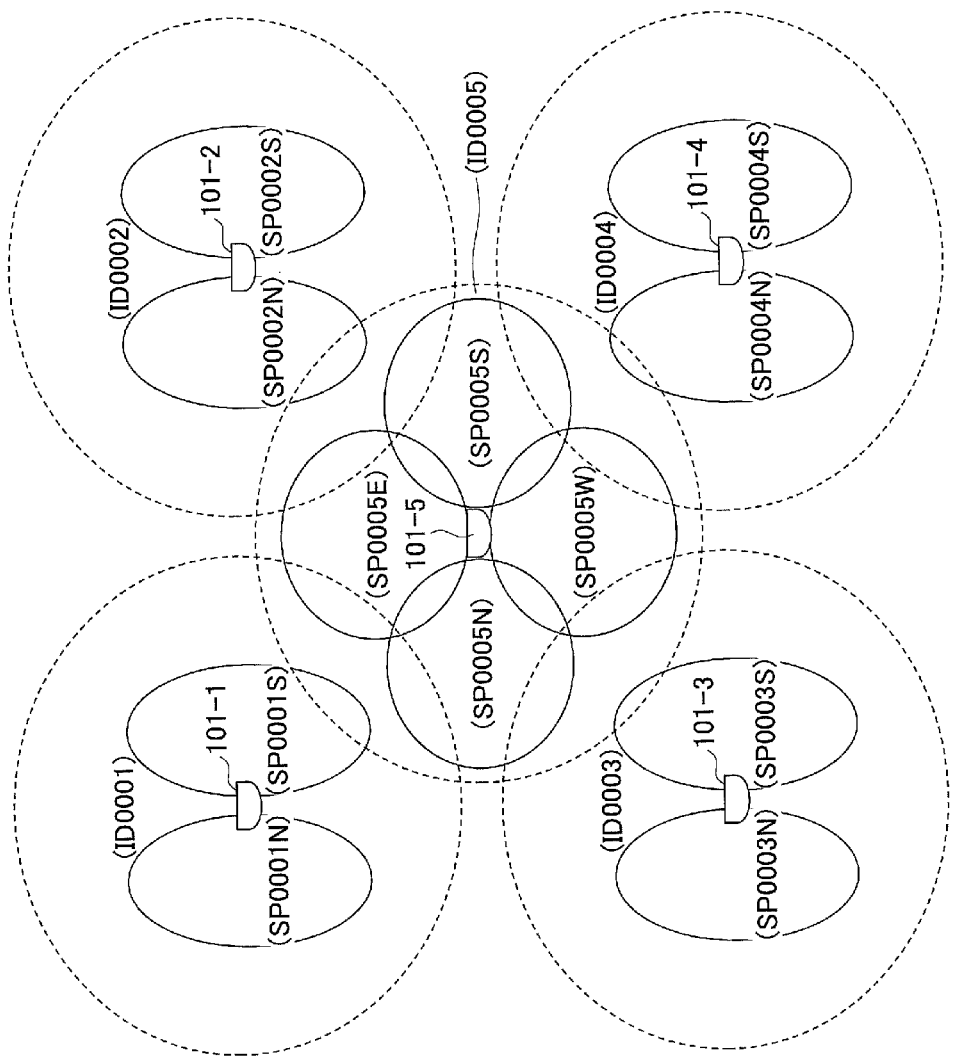
FIG. 3 is a diagram illustrating another example arrangement of a plurality of regions according to an embodiment of the present invention.

FIG. 3 is a diagram illustrating another example arrangement of the plurality of regions according to an embodiment of the present invention. In the example of FIG. 3, a transmitter 101-5 includes four speakers. The transmitter 101-5 outputs a sound wave including a speaker ID "SP0005N" from a first speaker, a sound wave including a speaker ID "SP0005E" from a second speaker, a sound wave including a speaker ID "SP0005S" from a third speaker, and a sound wave including a speaker ID "SP0005 W" from a fourth speaker.

As illustrated in FIG. 3, the position information management system 100 may include a plurality of transmitters 101 having different numbers of speakers, for example.

As can be appreciated, in the position information management system 100 according to the present embodiment, detailed position information of the information terminal 104 within a region covered by a transmitter 101 may be managed and provided. That is, by using the transmitter 101 according to the present embodiment, detailed position information of the information 104 may be easily provided even if restrictions are imposed on the arrangement of the transmitter 101 that outputs information including position information.

<Hardware Configuration>

(Transmitter External View)

FIGS. 4A-4C are diagrams illustrating example external views of the transmitter 101 according to an embodiment of the present invention.

FIG. 4A is a perspective view of the transmitter 101. The transmitter 101 includes a main base 401 and two speaker bases 402a and 402b that are attached to the main base 401. Further, speakers 403a and 403b with curved surfaces corresponding to the shape of curved surfaces of the two speaker bases 402a and 402b are respectively mounted on the speaker bases 402a and 402b.

The speaker 403a corresponds to the first speaker described above with reference to FIGS. 1-3. Note that in the following descriptions, the speaker 403a may also be referred to as "first speaker".

The speaker 403b corresponds to the second speaker described above with reference to FIGS. 1-3. Note that in the following descriptions, the speaker 403b may also be referred to as "second speaker".

In the present embodiment, it is assumed that a speaker ID is output using a sound wave having a high frequency of at least 16 kHz, for example. Note that the directivity of a sound wave increases as the frequency of the sound wave increases. In the transmitter 101 according to the present embodiment, the speakers 403a and 403b are arrange to have curved surfaces, and in this way, the sound wave output range may be adjusted (enlarged). Note, however, that the speakers 403a and 403b do not necessarily have to be arranged to have curved surfaces as described above, and may be arranged into any shape or configuration.

FIG. 4B is a top view of the transmitter 101. A sound collection hole 404 of a microphone is arranged on the upper face of the main base 401 of the transmitter 101. Note that the position of the sound collection hole 404 as illustrated in FIG. 4 is merely one example.

FIG. 4C is a side view of the transmitter 101. The speaker base 402a may be attached to the main base 401 by two opposing screws 405a, for example. Also, by loosening the screws 405a, the speaker base 402a may be moved (rotated)

around the screws 405a in the direction of arrow 406 or arrow 407 such that the mounting angle of the speaker base 402a with respect to the main base 401 may be changed. In this way, the transmitter 101 may be able to adjust the angle between the main base 401 and the output direction of a sound wave output by the speaker 403 (first angle).

Similarly, the speaker base 402b may be attached to the main base 401 by two opposing screws 405b. Also, by loosening the screws 405b, the speaker base 402b may be moved (rotated) around the screws 405a such that the mounting angle of the speaker base 402b with respect to the main base 401 may be changed. In this way, the transmitter 101 may be able to adjust the angle between the main base 401 and the output direction of a sound wave output by the speaker 403b (second angle).

As described above, the transmitter 101 is capable of changing at least one of the first angle formed between the transmitter 101 (main base 401) and the output direction of a sound wave output by the first speaker and the second angle formed between the transmitter 101 (main base 401) and the output direction of a sound wave output by the second speaker. In this way, the transmitter 101 may be able to individually adjust the angle (in the upward/downward direction) of the output direction of each sound wave output by each speaker, for example.

Figure 5A:
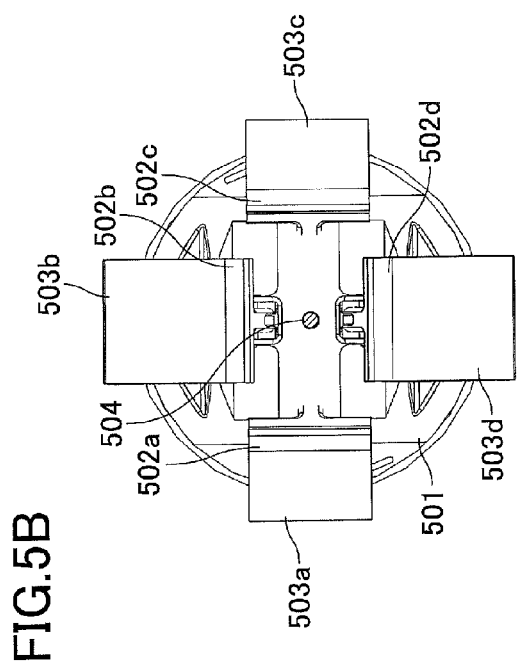
FIGS. 5A-5C are diagrams illustrating other example external views of the transmitter according to an embodiment of the present invention.
Figure 5B:
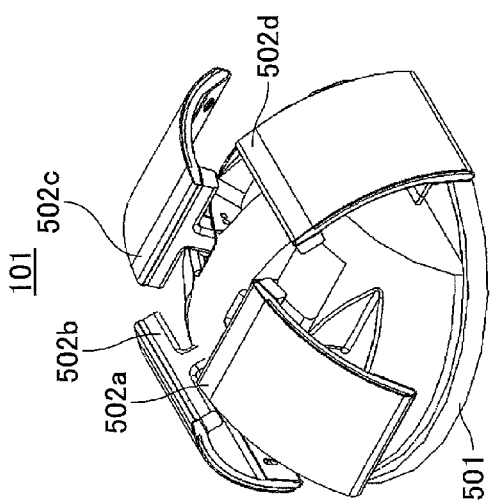
Figure 5C:
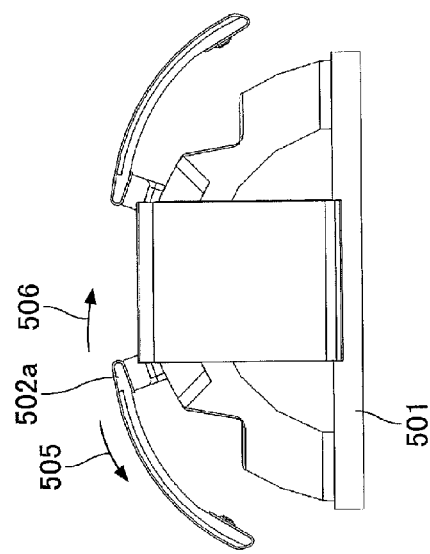

FIGS. 5A-5C are diagrams illustrating other example external views of the transmitter according to an embodiment of the present invention.

FIG. 5A is a perspective view of the transmitter 101. In the example of FIG. 5A, the transmitter 101 includes a main base 501 and four speaker bases 502a, 502b, 502c, and 502d that are mounted on the main base 501.

FIG. 5B is a top view of the transmitter 101. A sound collection hole 504 of a microphone is arranged on the upper face of the main base 501 of the transmitter 101. Also, four speakers 503a, 503b, 503c, and 503d with curved surfaces are respectively mounted on the four speaker bases 502a, 502b, 502c, and 502d.

FIG. 5C is a side view of the transmitter 101. The speaker base 502a may be mounted to a speaker drive unit arranged inside the main base 501, for example. The mounting angle of the speaker base 502a may be changed in the direction of arrow 505 or arrow 506 by controlling a stepping motor, for example.

Similarly, the other speaker bases 502b, 502c, and 502d may each be mounted on different speaker drive units arranged within the main base 501, for example. The mounting angle of each of the speaker bases 502b, 502c, and 502d may be individually changed by controlling a stepping motor, for example.

Note that the configuration and the number of speakers included in the transmitters 101 illustrated in FIGS. 4 and 5 are merely illustrative examples. In other examples, the two speaker bases 402a and 402b of FIG. 4 may be mounted on speaker drive units such that their mounting angles may be changed by the speaker drive units as in the example illustrated in FIG. 5.

(Transmitter Hardware Configuration)

FIG. 6 is a diagram showing an example hardware configuration of the transmitter 101 according to an embodiment of the present invention. The transmitter 101 includes a CPU (Central Processing Unit) 601, a RAM (Random Access Memory) 602, a flash ROM (Read Only Memory) 603, a wireless communication unit 604, a beacon transmitting unit 605, an audio processing unit 606, a microphone unit 607, an amplifying unit A 608-1, an amplifying unit B 608-2, a speaker unit A 609-1, and a speaker unit B 609-2.

The CPU 601 is a processor that implements various functions of the transmitter 101 by executing a program for the transmitter 101 stored in a storage device such as the flash ROM 603, for example. The RAM 602 is a volatile memory used as a working area for the CPU 601. The flash ROM 603 is a nonvolatile memory for storing a program for the transmitter 101 and various items of information including identification information, such as transmitter IDs speaker IDs, for example.

The wireless communication unit 604 is a wireless communication apparatus for establishing wireless communication with the gateway 103. The wireless communication unit 604 may include a transceiver circuit, an antenna, and a control circuit, for example. In the present embodiment, the wireless communication unit 604 may establish wireless communication with the gateway 103 using wireless technology, such as a wireless LAN, Zigbee (registered trademark), or a 920 MHz band specified low-power wireless module (IEEE 802.15.4g), for example.

The beacon transmitting unit 605 is a wireless transmission (communication) apparatus for transmitting a radio wave including the transmitter ID of the transmitter 101.

In a preferred embodiment, the beacon transmitting unit 605 is configured to transmit a radio wave including the transmitter ID of the transmitter 101 using short-range wireless communication technology, such as, Bluetooth (registered trademark) Low Energy (hereinafter, referred to as "BLE"), that is used to establish communication with the information terminal 104, for example. Note that the radio wave transmitted by the beacon transmitting unit 605 may reach a distance of up to approximately 10 m to 20 m, for example.

The audio processing unit 606 may perform various audio processes under control of the CPU 601. For example, the audio processing unit 606 may perform a process for generating a sound wave including a speaker ID, and a process for applying a Fast Fourier Transform (FFT) on ambient sound waves acquired by the microphone unit 607 and measuring the noise level of the frequency band used.

In a preferred embodiment, the audio processing unit 606, under control of the CPU 601, generates a sound wave including a speaker ID having a high frequency of at least 16 kHz of the audio frequency band, for example. Note that the directivity of a sound wave increases as the frequency of the sound wave increases, and at a frequency of 16 kHz or higher, the sound wave would be hardly audible to the human ear. Thus, a sound wave at such a high frequency may be suitable for transmitting information such as the speaker ID.

Note that the present embodiment is not limited to using a particular sound wave data transmission method. For example, a known modulation scheme, such as FSK (Frequency Shift Keying) or PSK (Phase Shift Keying), may be applied to a sound wave of a predetermined frequency to transmit information.

Alternatively, the sound wave data transmission method used in the present embodiment may involve indicating a digital value of "1" or "0" by turning on/off a sound wave of a predetermined frequency (e.g., 19 kHz), for example. In this case, the information terminal 104 that receives the sound wave may acquire information included in the sound wave by determining whether the predetermined frequency occurs at a predetermined sampling rate, for example.

Note that the audio processing unit 606 may be implemented by an audio processing semiconductor integrated circuit or a DSP (Digital Signal Processor), for example. Alternatively, the audio processing unit 606 may be implemented by a program run on the CPU 601, for example.

The microphone unit 607 includes a sound collection element such as a microphone. The microphone unit 607 converts a sound wave obtained by the microphone into an electrical signal.

The amplifying unit A 608-1 is a sound wave amplifier for amplifying a sound wave to be output to the speaker unit A 609-1. For example, the amplifying unit A 608-1 may change the volume (sound pressure) of the sound wave to be output to the speaker unit A 609-1 under control of the CPU 601.

The amplifying unit B 608-2 is a sound wave amplifier for amplifying a sound wave to be output to the speaker unit B 609-2. For example, the amplifying unit B 608-2 may change the volume (sound pressure) of the sound wave to be output to the speaker unit B 609-2 under control of the CPU 601.

Note that the number of amplifying units provided in the transmitter 101 corresponds to the number of speakers provided in the transmitter 101. In this way, the transmitter 101 can individually adjust the volume of each sound wave output by each speaker.

The speaker unit A 609-1 is a sound wave generating apparatus that converts a sound wave signal output by the amplifying unit A 608-1 into a sound wave. Note that the speaker unit A 609-1 corresponds to the first speaker described above with reference to FIGS. 1-3. In the following descriptions, the speaker unit A 609-1 may also be referred to as "first speaker".

The speaker unit B 609-2 is a sound wave generating apparatus that converts a sound wave signal output by the amplifying unit B 608-2 into a sound wave. Note that the speaker unit B 609-2 corresponds to the second speaker described above with reference to FIGS. 1-3. In the following descriptions, the speaker unit B 609-2 may also be referred to as "second speaker".

FIG. 7 is a diagram showing another example hardware configuration of the transmitter 101 according to an embodiment of the present invention.

The transmitter 101 illustrated in FIG. 7 includes a speaker drive unit A 701-1 and a speaker drive unit B 701-2 in addition to the hardware elements of the transmitter 101 illustrated in FIG. 6. Note that the hardware elements of the transmitter 101 illustrated in FIG. 7 other than the speaker drive unit A 701-1 and the speaker drive unit B 701-2 may be substantially identical to the hardware elements of the transmitter 101 illustrated in FIG. 6.

The speaker drive unit A 701-1 changes the angle (e.g., in the upward/downward direction) of the speaker unit A 609-1 under control of the CPU 601.

For example, referring to FIG. 5C, the speaker base 502a may be mounted on the speaker drive unit A 701-1 that is provided within the main base 501. The speaker drive unit A 701-1 may include a stepping motor, for example, and under control of the CPU 601, the speaker drive unit A 701-1 may change the mounting angle of the speaker base 502a in the direction of arrow 505 or arrows 506.

The speaker drive unit B 701-2 changes the angle (e.g., in the upward/downward direction) of the speaker unit B 609-1 under control of the CPU 601.

Note that in the example of FIG. 7, the number of speaker drive units provided in the transmitter 101 corresponds to the number of speakers provided in the transmitter 101. In this way, the transmitter 101 can individually change the angle of the speaker unit of each speaker.

(Management Server Hardware Configuration)

Figure 8:
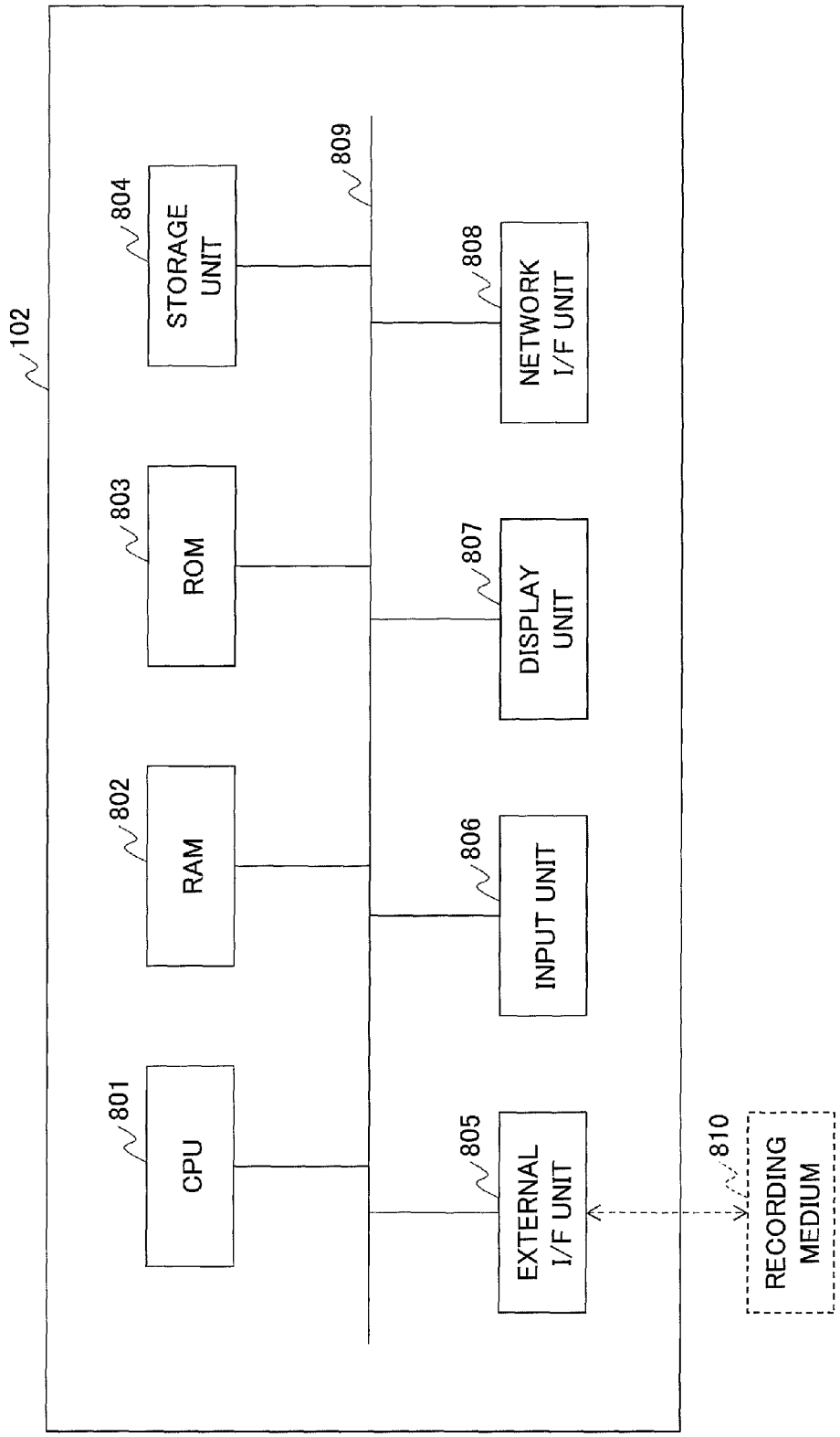
FIG. 8 is a block diagram illustrating an example hardware configuration of a management server according to an embodiment of the present invention.

FIG. 8 is a block diagram illustrating an example hardware configuration of the management server 102 according to an embodiment of the present invention. The management server 102 may have the configuration of a general-purpose computer, for example. In FIG. 8, the management server 102 includes a CPU 801, a RAM 802, a ROM 803, a storage unit 804, an external I/F (Interface) unit 805, an input unit 806, a display unit 807, a network I/F unit 808, and a bus 809.

The CPU 801 is a processor that implements various functions of the management server 102 by loading programs and data stored in a storage device, such as the ROM 803 or the storage unit 804, in the RAM 802, and executing processes based on the loaded programs and data. The RAM 802 is a volatile memory used as a working area for the CPU 801. The ROM 803 is a nonvolatile memory that is capable retaining programs and data even when the power is turned off.

The storage unit 804 may be a storage device, such as an HDD (Hard Disk Drive) or an SSD (Solid State Drive), for example. The storage unit 804 may store programs and data, such as an OS (Operation System), application programs, and various types of data.

The external I/F 805 is an interface with an external device. The external device may be a recording medium 810, for example. The management server 102 may read/write data from/in the recording medium 810 via the external I/F 805, for example. The recording medium 810 may be an optical disk, a magnetic disk, a memory card, a USB (Universal Serial Bus) memory, or the like. Also, a predetermined program may be stored in the recording medium 810, and the program stored in the recording medium 810 may be installed in the management server 102 via the external I/F 805. In this way, the management server 102 may be able to execute the predetermined program.

The input unit 806 is an input device, including a pointing device such as a mouse and/or a keyboard, for example, that is used to input operation signals to the management server 102. The display unit 807 is a display device for displaying information such as processing results obtained by the management server 102, for example.

The network I/F unit 808 is a communication interface, such as a wired/wireless LAN, for connecting the management server 102 to the network 106. The management server 102 may use the network I/F unit 808 to perform data communication with other devices via the network 106. The bus 809 is connected to the above hardware elements of the management server 102 and transmits address signals, data signals, and various control signals, for example.

(Gateway Hardware Configuration)

Figure 9:
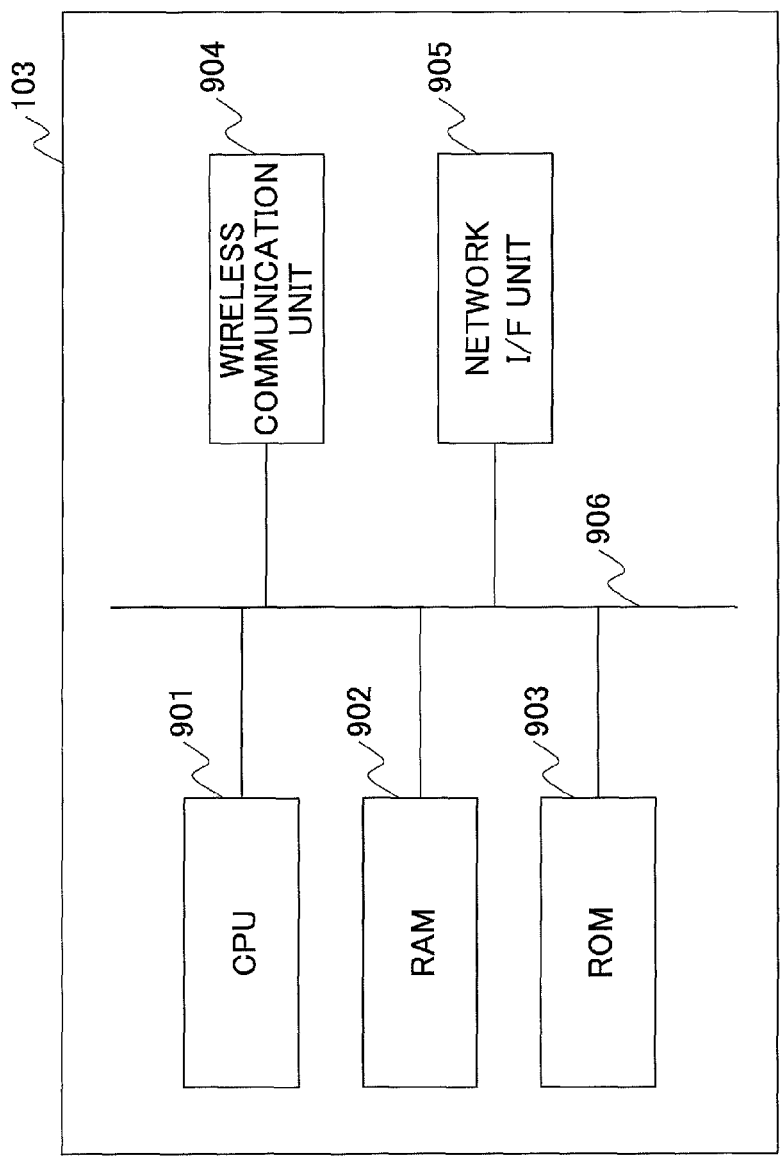
FIG. 9 is a block diagram illustrating an example hardware configuration of a gateway according to an embodiment of the present invention.

FIG. 9 is a block diagram illustrating an example hardware configuration of the gateway 103 according to an embodiment of the present invention. In FIG. 9, the gateway 103 includes a CPU 901, a RAM 902, a ROM 903, a wireless communication unit 904, a network I/F unit 905, and a bus 906.

The CPU 901 is a processor that implements various functions of the gateway 103 by loading programs and data stored in the ROM 903 or the like in the RAM 902, and executing processes based on the loaded programs and data. The RAM 902 is a volatile memory used as a working area for the CPU 901. The ROM 903 is a nonvolatile memory that stores a program for the gateway 103. The ROM 903 may be a rewritable nonvolatile memory, such as a flash ROM, or an EEPROM, for example.

The wireless communication unit 904 is a wireless communication apparatus for establishing wireless communication using wireless communication technology corresponding to that used by the wireless communication unit 604 of the transmitter 101, for example. The wireless communication unit 904 may include a transceiver circuit, an antenna, and a control circuit, for example.

The network I/F unit 905 is a communication interface, such as a wired/wireless LAN, that connects the gateway 103 to the network 106, for example.

The bus 906 is connected to the above hardware elements of the gateway 103, and transmits address signals, data signals, and various control signals, for example.

(Information Terminal Hardware Configuration)

Figure 10:
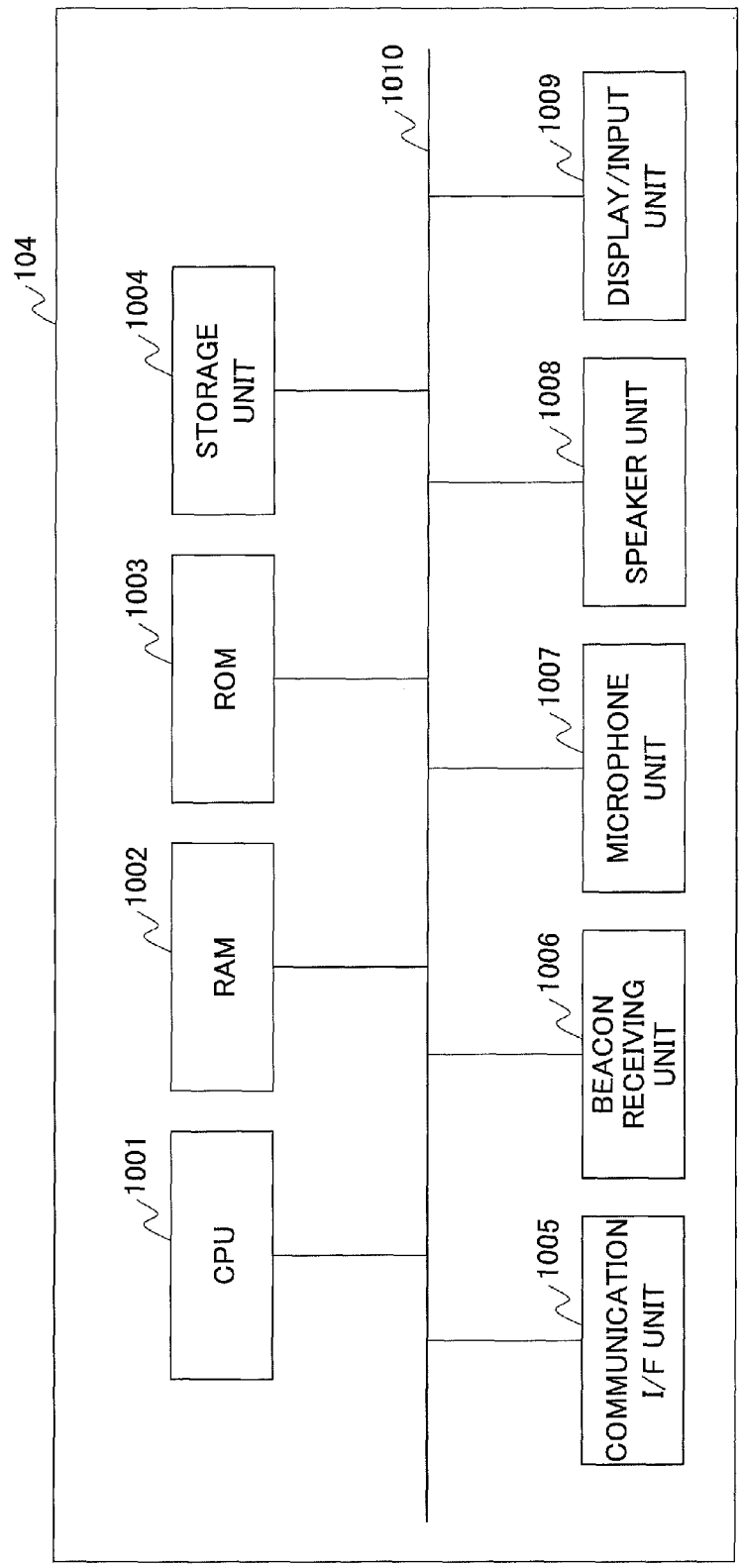
FIG. 10 is a block diagram illustrating an example hardware configuration of an information terminal according to an embodiment of the present invention.

FIG. 10 is a block diagram illustrating an example hardware configuration of the information terminal 104 according to an embodiment of the present invention. The information terminal 104 may have the configuration of a general-purpose computer, for example. In FIG. 10, the information terminal 104 includes a CPU 1001, a RAM 1002, a ROM 1003, a storage unit 1004, a communication I/F unit 1005, a beacon receiving unit 1006, a microphone unit 1007, a speaker-unit 1008, a display/input unit 1009, and a bus 1010.

The CPU 1001 is a processor that implements various functions of the information terminal 104 by loading programs and data stored in a storage device, such as the ROM 1003 or the storage unit 1004, in the RAM 1002, and executing processes based on the loaded programs and data. The RAM 1002 is a volatile memory used as a working area for the CPU 1001. The ROM 1003 is a nonvolatile memory that is capable retaining programs and data even when the power is turned off.

The storage unit 1004 may be a storage device, such as an HDD, an SSD, or a flash ROM that stores programs, such as an OS and application program, and various types of data, for example.

The communication I/F unit 1005 is a communication interface that is compatible with a communication scheme of a wireless LAN or a mobile communication network, such as the 3G (3rd. Generation) or the LTE (Long Term Evolution), for example. The information terminal 104 may establish connection with the network 106 via the communication I/F unit 1005 to perform data communication with the management server 102, for example.

The beacon receiving unit 1006 is a radio receiver (communication apparatus) for receiving a beacon including a transmitter ID output by the transmitter 101. The beacon receiving unit 1006 receives a radio wave transmitted by the transmitter 101 using the same communication scheme as that used by the beacon transmitting unit 605 of the transmitter 101 (e.g. BLE).

The microphone unit 1007 includes a sound collection element such as a microphone. The microphone unit 1007 converts a sound wave obtained by the microphone into an electric signal and further converts the electrical signal into ultrasound data in a predetermined format. Note that microphones included in smartphones of recent years have the capability to pick up sound waves of up to 20 kHz, or even 24 kHz in more preferred examples. Thus, if the microphone unit 1007 includes such a microphone, it may be able to acquire information that is converted into a high frequency signal of 16 kHz or higher that is included in the sound wave output by the transmitter 101, for example.

The speaker unit 1008 includes an audio transmitter such as a speaker. The speaker unit 1008 converts audio data into an audio signal, further converts the audio signal into a sound wave using the speaker, for example, and outputs the converted sound wave.

The display/input unit 1009 includes a display device such as LCD (Liquid Crystal Display) and an input device such as a touch panel. The display/input unit 1009 accepts input operations input by a user and displays screens generated by a program executed by the information terminal 104, for example.

The bus 1010 is connected to the above hardware elements of the information terminal 104 and transmits address signals, data signals, and various control signals, for example.

First Embodiment

Functional Configuration (Transmitter)

Figure 11:
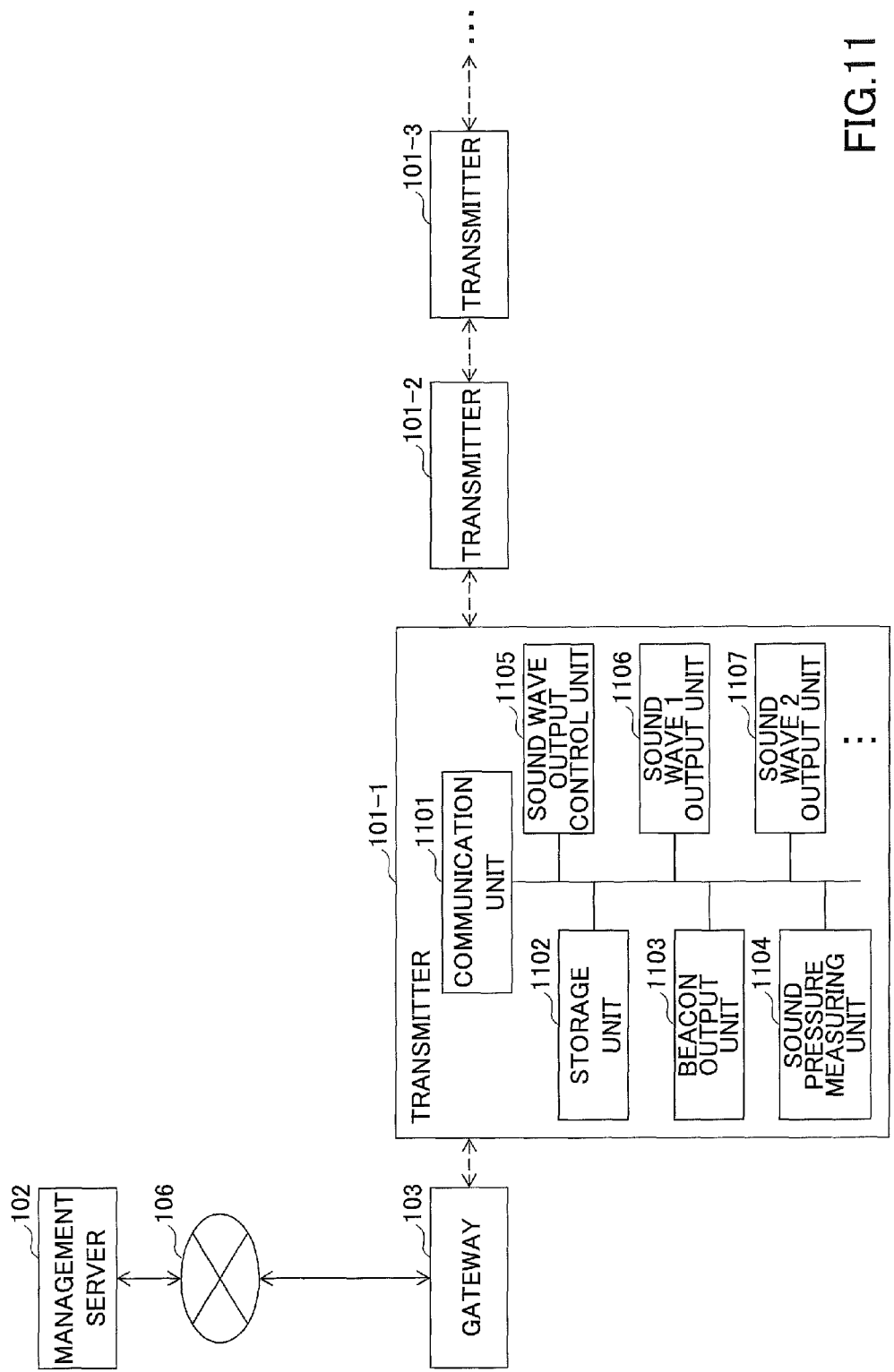
FIG. 11 is a block diagram illustrating an example functional configuration the transmitter according to an embodiment of the present invention.

FIG. 11 is a block diagram illustrating an example functional configuration of the transmitter 101 according to a first embodiment of the present invention. In FIG. 11, each transmitter 101 includes a communication unit 1101, a storage unit 1102, a beacon output unit 1103, a sound pressure measuring unit 1104, a sound wave control unit 1105, a sound wave 1 output unit 1106, and a sound wave 2 output unit 1107. Note that the number of sound wave output units (sound wave 1 output unit 1106 and sound wave 2 output unit 1107 in FIG. 11) may vary depending on the number of speakers provided in the transmitter 101.

The communication unit 1101 controls wireless communication over a wireless PAN (Personal Area Network) provided by the gateway 103 using the wireless communication unit 604 of FIG. 6. In the example of FIG. 11, multi-hop wireless technology, such as Zigbee, is used to configure the wireless PAN provided by the gateway 103.

For example, when the management server 102, transmits (broadcasts) predetermined information to a plurality of transmitters 101 via the gateway 103, the predetermined information is transmitted to the transmitter 101-1 via the gateway 103. The transmitter 101-1 that receives the predetermined information acquires required information (e.g., own address information, and own transmitter ID) and forwards the received predetermined information to the transmitter 101-2. The transmitter 101-2 that receives the predetermined information from the transmitter 101-1 acquires required information, and forwards the received predetermined information to the transmitter 101-3. That is, in the example of FIG. 11, information that is transmitted over the wireless PAN provided by the gateway 103 is sequentially transmitted from one transmitter 101 to another transmitter 101 that are adjacent to each other.

Also, when the transmitter 101-3 transmits receipt confirmation of the predetermined information to the management server 102, for example, the receipt confirmation is sequentially transmitted from the transmitter 101-3 to the transmitter 101-2, the transmitter 101-1, and the gateway 103 to be received by the management server 102.

The communication unit 1101 controls the above-described communications. The communication unit 1101 may be included in the wireless communication unit 604 of FIG. 6, or the communication unit 1101 may be implemented by a program run on the CPU 601 of FIG. 6, for example.

The storage unit 1102 stores information, such as the transmitter ID and the speaker IDs of the transmitter 101. The storage unit 1102 may be implemented by the flash ROM 603, the RAM 602, and a program run on the CPU 601 of FIG. 6, for example.

The beacon output unit (radio wave output unit) 1103 may use the beacon transmitting unit 605 of FIG. 6 to transmit a beacon including the transmitter ID stored in the storage unit 1102 within a predetermined range, for example. The beacon output unit 1103 may be implemented by a program run on the CPU 601 of FIG. 6, for example. The transmitter ID included in the beacon transmitted by the beacon output unit 1103 may be unique identification information assigned to each transmitter 101, for example. Alternatively, the transmitter ID included in the beacon transmitted by the beacon output unit 1103 may be a transmitter ID that is designated by the management server 102, for example. In the following descriptions, it is assumed that the beacon output unit 1103 transmits unique identification information of the transmitter 101 as the transmitter ID.

The sound pressure measuring unit (sound wave measuring unit) 1104 measures ambient sound waves around the transmitter 101 (e.g., amount of sound waves) using the microphone unit 607 of FIG. 6. For example, the sound pressure measuring unit 1104 may measure the ambient noise level around the transmitter 101 and notify the management server 102 of the measurement result.

In a preferred embodiment, the sound pressure measuring unit 1104 is also capable of measuring the output sound pressure level of a sound wave output by the transmitter 101 and detecting information such as the speaker ID included in the sound wave using the microphone unit 607 of FIG. 6. For example, in a case where sound waves acquired by the sound pressure measuring unit 1104 using the microphone unit 607 includes a plurality of sound waves including a plurality of speaker IDs, the sound pressure measuring unit 1104 may determine the sound pressure level of each sound wave including a speaker ID, and transmit the sound pressure measurement obtained with respect to each speaker ID to the management server 102.

The information on the sound pressure level measurements obtained by the sound pressure measuring unit 1104 may be used when implementing feedback on the output level of the sound waves output by the transmitter 101, for example. Note that the sound pressure measuring unit 1104 may be implemented by the audio processing unit 606 and a program run on the CPU 601 of FIG. 6, for example.

The sound wave output control unit 1105 generates a sound wave including a speaker ID to be output by the first speaker or the second speaker based on the speaker IDs received from the management server 102 and stored in the storage unit 1102, for example.

In a preferred embodiment, the speaker ID included in the sound wave to be output by the first speaker or the second speaker includes information on the direction in which the relevant speaker is to output the sound wave.

For example, with respect to FIG. 2, it is assumed that the direction toward the left in FIG. 2 is "north (N)", and the direction toward the right is "south (S)". In this case, the sound wave to be output to the first region 202 by the first speaker (sound wave 1 output unit 1106) of the transmitter 101-1 in FIG. 2 includes the speaker ID "SP00001N". Note that in this example, "N" at the end of the speaker ID indicates the direction of the first speaker (North).

Similarly, the sound wave to be output to the second region 203 by the second speaker (sound wave 2 output unit 1107) of the transmitter 101-1 in FIG. 2 includes the speaker ID "SP0001S". Note that in this example, "S" at the end of the speaker ID indicates the direction of the second speaker (South).

Also, the sound wave output control unit 1105 is capable of individually controlling the volume and the frequency of the sound wave to be output by each of the speakers, such as the first speaker and the second speaker, for example. Note that the sound wave output control unit 1105 may be implemented by the audio processing unit 606 and a program run on the CPU 601 of FIG. 6, for example.

In this way, the sound wave output control unit 1105 is capable of individually controlling the sound wave (first sound wave) to be output by the first speaker and the sound wave (second sound wave) to be output by the second speaker based on a request from the management server 102.

The sound wave 1 output unit 1106 may periodically or continuously output a sound wave generated by the sound wave output control unit 1105 using the first speaker and the amplifying unit A 608-1 of FIG. 6, for example. With respect to FIG. 2, for example, the sound wave 1 output unit 1106 of the transmitter 101-1 outputs the first sound wave including the speaker ID "SP0001N" (first unique information) in the direction toward the first region 202 (first output direction).

Also, the sound wave 1 output unit 1106, under control of the sound wave output control unit 1105, may adjust (change) the output level (volume) of the first sound wave to be output by the first speaker or turn on/off the first speaker, for example.

The sound wave 2 output unit 1107, may periodically or continuously output a sound wave generated by the sound wave output control unit 1105 using the second speaker and the amplifying unit B 608-2 of FIG. 6, for example. With respect to FIG. 2, for example, the sound wave 2 output unit 1107 of the transmitter 101-1 outputs the second sound wave including the speaker ID "SP0001S" (second unique information) in the direction toward the second region 203 (second output direction).

Also, the sound wave 2 output unit 1107, under control of the sound wave output control unit 1105, may adjust (change) the output level (volume) of the second sound wave to be output by the second speaker or turn on/off the second speaker, for example.

Note that the sound wave 1 output unit 1106 and the sound wave 2 output unit 1107 may be implemented by a program run on the CPU 601 of FIG. 6, for example.

With the above configuration, the transmitter 101 may output sound waves including different speaker IDs from a plurality of speakers that are provided in the transmitter 101. Further, the transmitter 101 may be able to individually control the volume, the frequency, and other properties of the sound wave output by each of the plurality of speakers.

Alternative Example

Figure 12:
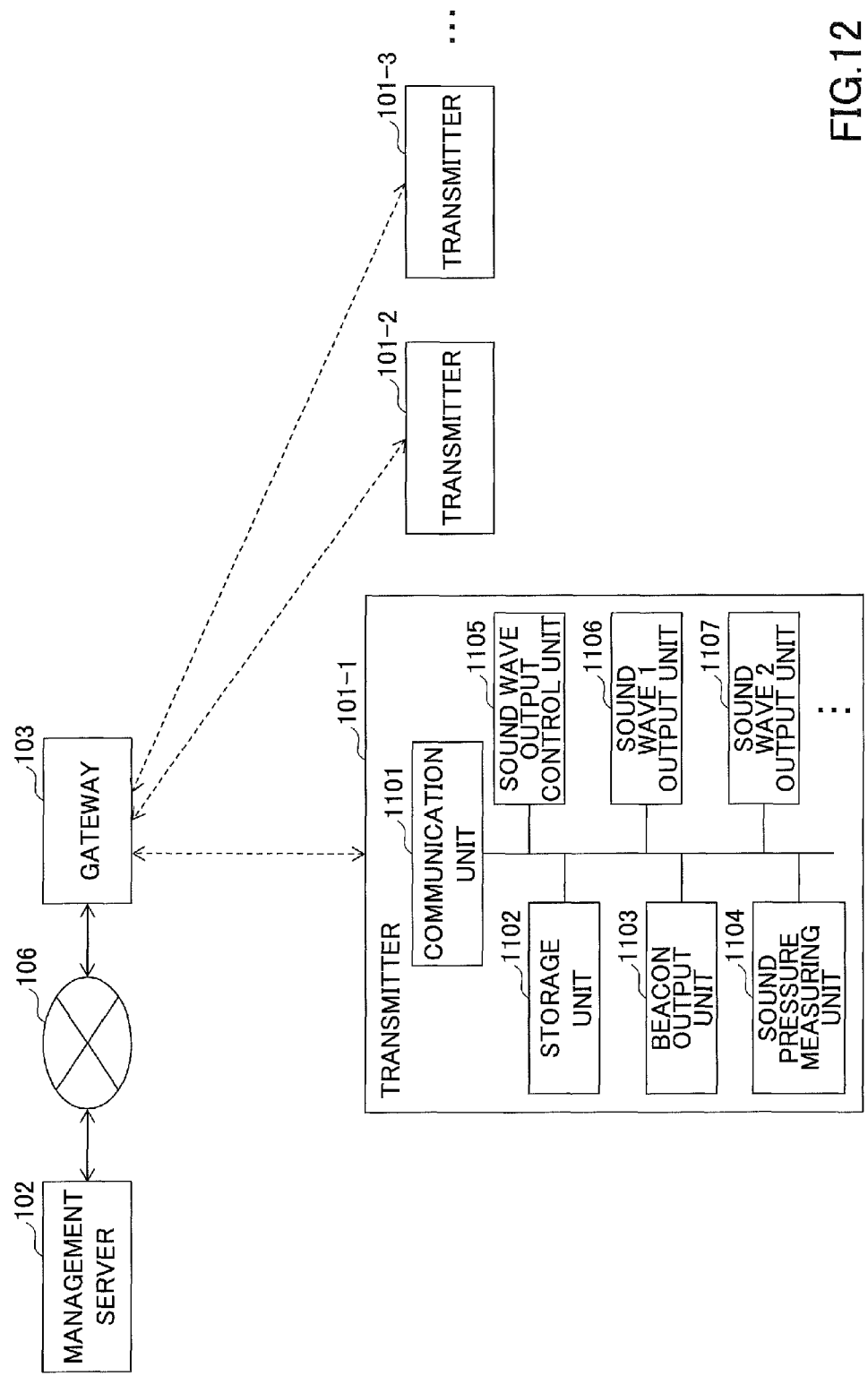
FIG. 12 is a block diagram illustrating another example functional configuration of the transmitter according to an embodiment of the present invention.

FIG. 12 is a block diagram illustrating another example functional configuration of the transmitter 101 according to the first embodiment. In the example of FIG. 12, a 920 MHz band specified low-power wireless module (IEEE 802.15.4g) is used to configure the wireless PAN provided by the gateway 103. Note that although the transmission rate specified by the above wireless technology is relatively low at approximately 200 Kbps, data may be transmitted over a distance of up to approximately several hundred meters (m) with a current consumption of approximately several dozens of milliamperes (mA). By using this wireless technology, for example, instead of establishing multi-hop wireless communication between the gateway 103 and the transmitters 101 as in the example of FIG. 11, single-hop data transfer (transmission/reception) between the gateway 103 and the transmitters 101 may be enabled with low power consumption, for example. Further, the area of the wireless PAN may be readily enlarged by adding one or more gateways 103 to the position information management system 100, for example.

In the example of FIG. 12, the communication unit 1101 of each transmitter 101 communicates directly with the gateway 103. For example, when the management server 102 broadcasts predetermined information to a plurality of transmitters 101 via the gateway 103, the predetermined information may be transmitted directly from the gateway 103 to each of the transmitters 101.

Also, in the case of transmitting a receipt confirmation to the management server 102, for example, each of the transmitters 101 may transmit the receipt confirmation to the management server 102 via the gateway 103.

Note that the configuration of the transmitter 101 illustrated in FIG. 12 other than the communication unit 1101 of the transmitter 101 may be substantially the same as that of the transmitter 101 illustrated in FIG. 11.

(Position Information Management System)

Figure 13:
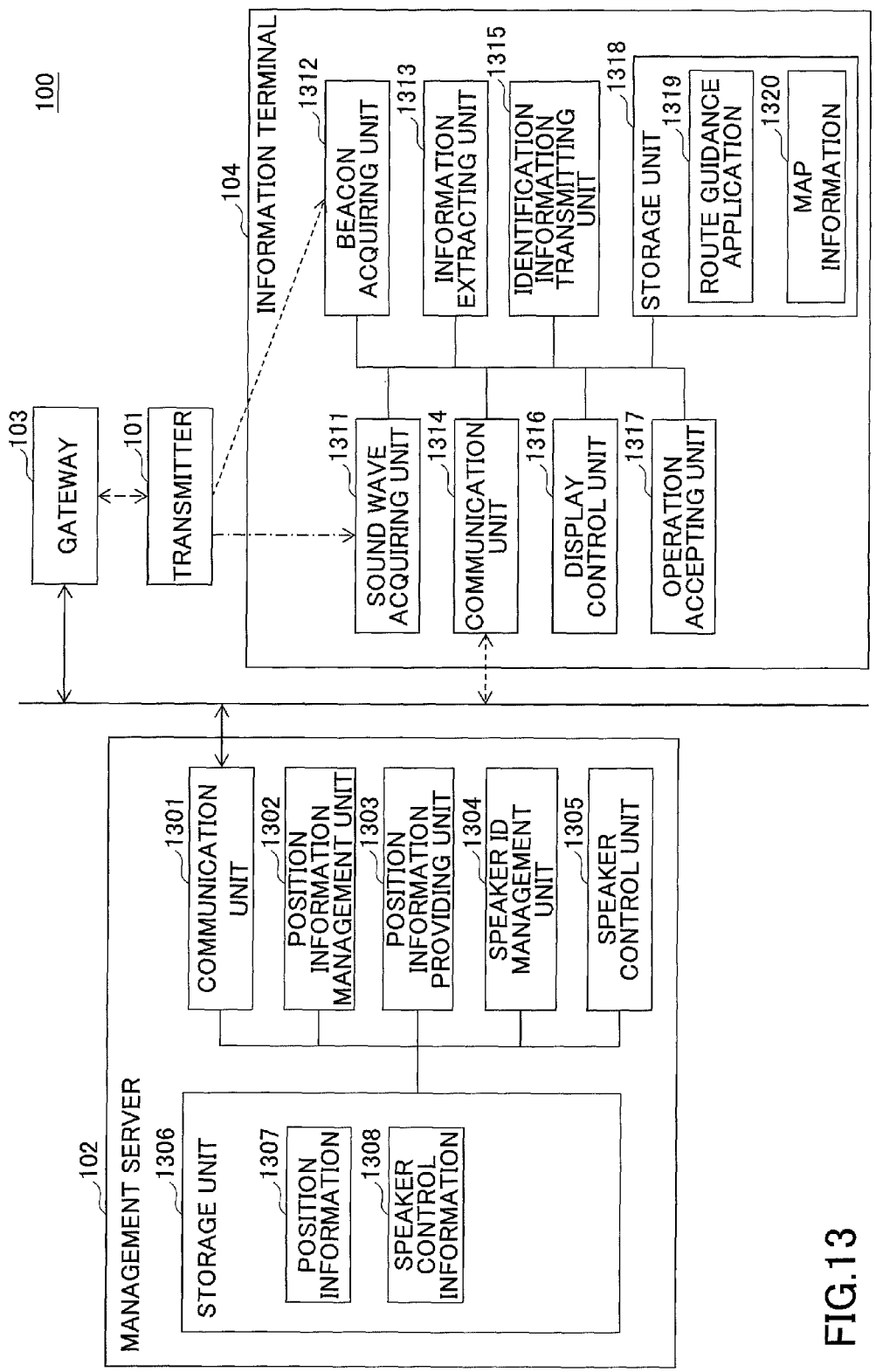
FIG. 13 is a block diagram illustrating an example functional configuration of the position information management system according to an embodiment of the present invention.

FIG. 13 is a block diagram illustrating an example functional configuration of the position information management system 100 according to the first embodiment. In FIG. 13, the position information management system 100 includes at least the transmitter 101, the management server 102, the gateway 103, and the information terminal 104.

(Management Server)

The management server 102 includes a communication unit 1301, a position information management unit 1302, a position information providing unit 1303, a speaker ID management unit 1304, a speaker control unit 1305, and a storage unit 1306.

The communication unit 1301 connects the management server 102 to the network 106 to establish communication with the gateway 103 and the information terminal 104, for example. The communication unit 1301 may be implemented by the network I/F unit 808 and a program run on the CPU 801 of FIG. 8, for example.

The position information management unit 1302 stores and manages information relating to the positions of the plurality of transmitters 101 and the information terminal 104 in the storage unit 1306 as position information 1307. Note that the position information management unit 1302 may be implemented by a program run on the CPU 801 of FIG. 8, for example.

FIGS. 14A-14C are tables illustrating examples of position information managed by the position information management unit 1302 according to the first embodiment.

FIG. 14A illustrates an example of transmitter position information. The transmitter position information illustrated in FIG. 14A includes information items, such as "transmitter ID", "speaker ID", "direction", "angle (vertical)", "position coordinates", and "position description". The "transmitter ID" is identification information for identifying the transmitter 101.

The "speaker ID" indicates the speaker IDs included in the sound waves output by the plurality of speakers (e.g., first speaker and second speaker) provided in the transmitter 101. According to FIG. 14A, the first speaker of the transmitter 101 with the transmitter ID "ID0001" outputs a sound wave including the speaker ID "SP0001N", and the second speaker outputs a sound wave including the speaker ID "SP0001S".

The "direction" is information indicating the direction in which each of the speakers (e.g. first speakers and second speaker) output a sound wave.

The "angle (vertical)" is information indicating the angle of each of the speakers in the upward/downward direction.

The "position coordinates" is information indicating the coordinates of the installation position of the transmitter 101.

In the present embodiment, it is assumed that the information items, such as the "direction", the "angle (vertical)", and the "position coordinates", of the transmitter 101 are determined and registered by the person that has installed the transmitter 101.

For example, with respect to the "position coordinates", the position coordinates of a predetermined installation location for the transmitter 101 may be measured by a position measuring device, and the measured position coordinates may be registered as position information of the transmitter 101. The person in charge of installing the transmitter 101 may install the transmitter 101 at the position coordinates of the predetermined installation location and arrange the first speaker to face north, for example. Also, a predetermined angle (e.g. 45 degrees) may be registered in advance as the "angle (vertical)" of the speaker, and when the person in charge of installing the transmitter 101 changes the angle of the speaker, the person may update the value of the "angle (vertical)".

The "position description" includes relevant information, such as a description to accompany the position coordinates, a timetable, store information, a store URL, and the distance to/from a transportation system, for example.

Note that in the example of FIG. 14A, the "position coordinates" are represented by x and y coordinates. However, in other examples, the "position coordinates" may be represented by x, y, and z coordinates as illustrated in FIG. 14B. In this way, for example, information indicating the floor of the building 107 may be stored and managed using the z coordinate.

FIG. 14C illustrates an example of information terminal position information. In the present embodiment, when the information terminal 104 acquires a transmitter ID included in a beacon transmitted by a transmitter 101 and a speaker ID included in a sound wave output by the transmitter 101, the information terminal 104 transmits sender information including the acquired information and an app ID of the app run on the information terminal 104 to the management server 102.

The position information management unit 1302 of the management server 102 may store and manage the information received from the information terminal 104 as information terminal position information as illustrated in FIG. 14C. The information terminal position information of FIG. 14C includes information items, such as "information terminal ID", "transmitter ID", "speaker ID", "acquisition date/time", "position coordinates", and "direction", for example.

The "information terminal ID" is identification information for identifying the information terminal 104 (e.g. app ID of the app run on the information terminal 104).

The "transmitter ID" is the transmitter ID included in the beacon that has been acquired by the information terminal 104.

The "speaker ID" is the speaker ID included in the sound wave that has been acquired by the information terminal 104.

Note that the information items, such as the "information terminal ID", the "transmitter ID", and the "speaker ID", are updated by the position information management unit 1302 based on the sender information received from the information terminal 104 via the communication unit 1301.

The "acquisition date/time" is information indicating the date and time the above-described sender information has been acquired by the information terminal 104.

The "position coordinates" is information indicating the position coordinates of the information terminal 104 which may be determined based on the above "information terminal ID", "transmitter ID", and "speaker ID" and the transmitter position information of FIG. 14B, for example. With respect to the information terminal position information of FIG. 14C, for example, it can be appreciated that the transmitter ID "ID0001" and the speaker ID "SP0001S" are registered in association with the information terminal 104 identified by the app ID (identification information) "AP0001". Thus, based on the transmitter position information of FIG. 14B, it can be determined that the position coordinates "x0001, y0001, z0001" registered in association with the transmitter ID "ID0001" and the speaker ID "SP0001S" corresponds to the position coordinates of the information terminal 104 identified by the app ID "AP0001".

The "direction" is information indicating the direction (e.g., north or south) of the location of the information terminal 104 with respect to the "position coordinates" which may also be determined based on the above "information terminal ID", "transmitter ID", and "speaker ID" and the transmitter position information of FIG. 14B, for example.

As described above, the position information management unit 1302 of the management server 102 is capable of managing information on the position coordinates of the information terminal 104 and the direction of the information terminal 104 with respect to the position coordinates, based on information items, such as the "information terminal ID", the "transmitter ID", and the "speaker ID" transmitted from the information terminal 104.

The position information providing unit 1303 provides position information of the information terminal 104 (position coordinates, direction, etc.) in response to a request from the information terminal 104. The position information providing unit 1303 may be implemented by a program run on the CPU 801 of FIG. 8, for example.

The speaker ID management unit 1304 manages speaker IDs of the plurality of transmitters 101 included in the position information management system 100, and may be implemented by a program run on the CPU 801 of FIG. 8, for example. The speaker ID management unit 1304 may periodically or occasionally change the speaker IDs of the transmitter position information of FIG. 14A or 14S, and use the speaker control unit 1305 to change the speaker IDs of the plurality of transmitters 101, for example.

The speaker control unit 1305 performs control operations with respect to the speakers (e.g., first speaker, second speaker) of the transmitter 101, and may be implemented by a program run on the CPU 801 of FIG. 8, for example. When a speaker ID of the transmitter 101 is changed by the speaker ID management unit 1304, for example, the speaker control unit 1305 sends a speaker ID change request including the changed speaker ID to each of the transmitters 101 included in the position information management system 100. Also, the speaker control unit 1305 controls the volume of the sound wave output by each speaker of the transmitter 101 based on speaker control information 1308 stored in advance in the storage unit 1306.

FIG. 15 is a table illustrating an example of speaker control information managed by the speaker, control unit 1305 according to the first embodiment. The speaker control information of FIG. 15 includes information items, such as "ambient noise level (1-10)", "output level correction value", and "output sound pressure level (estimate)", for example.

The "ambient noise level (1-10)" indicates the level of noise measured by the transmitter 101 based on a scale of numbers representing different measurement levels (e.g. 10 levels). In the example of FIG. 15, a larger number represents a higher ambient noise level.

The "output level correction value" indicates a correction value for each ambient noise level. In the example of FIG. 15, the output level correction value increases as the value of the ambient noise level increases. Note that an output level correction value of "0" indicates that a sound wave is to be output at a default value set up in the transmitter 101.

The "output sound pressure level (estimate)" indicates an estimated value of the sound pressure level to be detected when the microphone unit 607 of the transmitter 101 acquires a sound wave output by the transmitter 101 that has been subjected to output level correction. Note that the output level correction (control process) is described in detail below.

(Information Terminal)

The information terminal 104 includes a sound wave acquiring unit 1311, a beacon acquiring unit 1312, an information extracting unit 1313, a communication unit 1314, an identification information transmitting unit 1315, a display control unit 1316, an operation accepting unit 1317, and a storage unit 1318.

Note that the above functional elements of the information terminal 104 may be implemented by executing a program stored in the storage unit 1318 (e.g., route guidance application 1319) for implementing the position information management system 100, for example.

The sound wave acquiring unit 1311 uses the microphone unit 1007 of FIG. 10 to acquire a sound wave output by the transmitter 101. The sound wave acquiring unit 1311 may be implemented by the microphone unit 1007 and a program run on the CPU 1001 of FIG. 10, for example.

The beacon acquiring unit 1312 may use the beacon receiving unit 1006 of FIG. 10, for example, to acquire a beacon transmitted by the transmitter 101. The beacon acquiring unit 1312 may be implemented by the beacon receiving unit 1006 and a program run on the CPU 1001 of FIG. 10, for example.

The information extracting unit 1313 extracts a speaker ID included in the sound wave acquired by the sound wave acquiring unit 1311. Also, the information extracting unit 1313 extracts a transmitter ID included in the beacon acquired by the beacon acquiring unit 1312. The information extracting unit 1313 may be implemented by the beacon receiving unit 1006 and a program run on the CPU 1001 of FIG. 10, for example.

The communication unit 1314 connects the information terminal 104 to the network 106 to establish communication with the management server 102, for example. The communication unit 1314 may be implemented by the communication I/F unit 1005 and a program run on the CPU 1001 of FIG. 10, for example.

The identification information transmitting unit 1315 transmits sender information including the transmitter ID and the speaker ID extracted by the information extracting unit 1313 and identification information of the information terminal 104 (e.g. app ID) to the management server 102 via the communication unit 1314. The identification information transmitting unit 1315 may be implemented by a program run on the CPU 1001 of FIG. 10, for example.

The display control unit 1316 may control the display/input unit 1009 of FIG. 10 to display a route guidance screen generated by the route guidance application 1319, for example. The display control unit 1316 may be implemented by a program run on the CPU 1001 of FIG. 10, for example.

The operation accepting unit 1317 accepts a user operation (e.g., destination setting) for the route guidance application 1319, for example. The operation accepting unit 1317 may be implemented by the display/input unit 1009 and a program run on the CPU 1001 of FIG. 10, for example.

<Process Flow>

In the following, detailed process steps of a position information management method implemented by the management server 102 are described.

(Speaker ID Setting Process)

FIG. 16 is a sequence chart illustrating an example process sequence of a speaker ID setting process according to the first embodiment. In this example process, the management server 102 transmits a speaker ID setting request to the transmitters 101 that have the functional configuration as illustrated in FIG. 11.

In step S1601, the speaker control unit 1305 of the management server 102 transmits (broadcasts) a speaker ID setting request to a plurality of transmitters 101 via the gateway 103. The speaker ID setting request may include information, such as the "transmitter ID" and the "speaker ID" associated with each "transmitter ID" as illustrated in FIG. 14A, for example.

In step S1602, the gateway 103 transmits the speaker ID setting request received from the management server 102 to the transmitter 101-1.

In step S1603, upon receiving the speaker ID setting request, the transmitter 101-1 acquires the speaker IDs "SP0001N" and "SP0001S" that are associated with the transmitter ID "ID0001" of the transmitter 101-1 from the received speaker ID setting request and stores the acquired speaker IDs in the storage unit 1102. In turn, based on the speaker IDs newly stored in the storage unit 1102, the sound wave output control unit 1105 updates (changes) the speaker IDs to be included in the sound waves output by the sound wave 1 output unit 1106 and the sound wave 2 output unit 1107, for example.

In step S1604, the transmitter 101-1 transmits the received speaker ID setting request to the transmitter 101-2.

In steps S1605 and S1606, the transmitter 101-1 transmits a completion notification indicating that the speaker IDs have been set up to the management server 102 via the gateway 103. The completion notification may include the transmitter ID of the transmitter 101-1, for example. By receiving the completion notification from the transmitter 101-1, the management server 102 may be able to recognize that operations for setting up the speaker IDs at the transmitter 101-1 have been completed.

In step S1607, upon receiving the speaker ID setting request from the transmitter 101-1, the transmitter 101-2 acquires the speaker IDs "SP0002N" and "SP0002S" that are associated with the transmitter ID "ID0002" of the transmitter 101-2 from the received speaker ID setting request, and stores the acquired speaker IDs in the storage unit 1102. In turn, based on the speaker IDs newly stored in the storage unit 1102, the sound wave output control unit 1105 updates (changes) the speaker IDs to be included in the sound waves output by the sound wave 1 output unit 1106 and the sound wave 2 output unit 1107, for example.

In step S1608, the transmitter 101-2 transmits the received speaker ID setting request to the transmitter 101-3.

In steps S1609 through S1611, the transmitter 101-2 transmits a completion notification indicating that the speaker IDs have been set up to the management server 102 via the transmitter 101-1 and the gateway 103. The completion notification may include the transmitter ID of the transmitter 101-2, for example. By receiving the completion notification from the transmitter 101-2, the management server 102 may be able to recognize that operations for setting up the speaker IDs at the transmitter 101-2 have been completed.

In step S1612, upon receiving the speaker ID setting request from the transmitter 101-2, the transmitter 101-3 acquires the speaker IDs "SP0003N" and "SP0003S" that are associated with the transmitter ID "ID0003" of the transmitter 101-3 from the received speaker ID setting request and stores the acquired speaker IDs in the storage unit 1102. In turn, based on the speaker IDs newly stored in the storage unit 1102, the sound wave output control unit 1105 updates (changes) the speaker IDs to be included in the sound waves output by the sound wave 1 output unit 1106 and the sound wave 2 output unit 1107, for example.

In steps S1613 through S1616, the transmitter 101-3 transmits a completion notification indicating that the speaker IDs have been set up to the management server 102 via the transmitters 101-1 and 101-2 and the gateway 103. The completion notification may include the transmitter ID of the transmitter 101-3, for example. By receiving the completion notification from the transmitter 101-3, the management server 102 may be able to recognize that operations for setting up the speaker IDs at the transmitter 101-3 have been completed.

Note that the management server 102 may also implement a process similar to that illustrated in FIG. 16 to selectively change speaker ID settings of one of the plurality of transmitters 101 (e.g., transmitter 101-2). For example, when the management server 102 is unable to receive a completion notification from the transmitter 101-2, the management server 102 may transmit a speaker ID setting request including the transmitter ID of the transmitter 101-2 and the speaker IDs to be set up in the transmitter 101-2.

In this case, when a transmitter 101 other than the transmitter 101-2 receives the speaker ID setting request and determines that its own transmitter ID is not included in the received speaker ID setting request, the transmitter 101 may simply forward the speaker ID setting request to the next transmitter 101 without acquiring any speaker IDs. When the transmitter 101-2 receives the speaker ID setting request including the its own transmitter ID, the transmitter 101-2 may simply set up the speaker IDs included in the received speaker ID setting request without transmitting the speaker ID setting request to the next transmitter 101, for example.

Note that FIG. 16 merely illustrates one example speaker ID setting process. In other examples, when the transmitter 101 receives a speaker ID setting request from the management server 102, the transmitter 101 may be configured to change (generate) speaker IDs of its own speakers and notify the management server 102 of the changed (generated) speaker IDs.

(Speaker Output Level Control Process)

FIG. 17 is a sequence chart illustrating an example sequence of a speaker output level control process according to the first embodiment. The process of FIG. 17 may be executed periodically, irregularly, or in response to a request from the management server 102, for example.

In step S1701, the sound pressure measuring unit 1104 of the transmitter 101-1 measures the ambient noise level around the transmitter 101-1 using the microphone unit 1007. For example, the sound pressure measuring unit 1104 may use a frequency filter to measure the noise level of a frequency band (e.g., 14 kHz to 16 kHz) other than the frequency of the sound waves output by the transmitter 101-1 multiple times (e.g. 10 times) and obtain the average value of the measured noise levels.

In steps S1702 and S1703, the sound pressure measuring unit 1104 of the transmitter 101-1 transmits the measured noise level to the management server 102 via the gateway 103. Note that the measured noise level transmitted by the sound pressure measuring unit 1104 may be the actual measured value or a number indicating a corresponding level of the measured noise level with respect to a range of numbers representing different measurement levels (e.g., 10 different levels ranging from level 1 to level 10). In the following descriptions, the noise level is represented by a corresponding level out of 10 different levels ranging from level 1 to level 10.

In step S1704, the speaker control unit 1305 of the management server 102 determines a correction value for the output level based on the speaker control information 1308 stored in the storage unit 1306 of the management server 102. For example, according to the speaker control information 1308 of FIG. 15, when the ambient noise level is "6", the correction value for the output level is "+2 dB".

In steps S1705 and S1706, the speaker control unit 1305 of the management server 102 notifies the transmitter 101-1 of the correction value determined in step S1704 via the gateway 103.

In step S1707, the sound wave output control unit 1105 of the transmitter 101-1 uses the correction value for the output level received from the management server 102 to correct the volume of the sound waves output by the speakers (e.g., the first speaker and the second speaker) of the transmitter 101-1.

In step S1708, the sound pressure measuring unit 1104 of the transmitter 101-1 uses the microphone unit 607 to measure the output levels of the sound waves output by the transmitter 101-1.

In a preferred embodiment, when measuring the output level of a sound wave output by the transmitter 101-1, the sound pressure measuring unit 1104 disables the above-described frequency filter and measures a peak value of the sound wave. Also, the sound pressure measuring unit 1104 may extract the speaker ID included in the measured sound wave to verify that the correct speaker ID is being output by the transmitter 101-1, for example.

In steps S1709 and S1710, the sound wave output control unit 1105 of the transmitter 101-1 notifies the management server 102 of the output level measurement via the gateway 103.

Upon receiving the output level measurement from the transmitter 101-1, the management server 102 may compare the received output level measurement with the "output sound pressure level (estimate)" included in the speaker control information 1308 of FIG. 15, for example.

For example, when the output level measurement notified by the transmitter 101-1 is outside a predetermined range centered around the output sound pressure level (estimate) for the measured ambient noise level, the management server 102 may direct the transmitter 101-1 to perform further corrections such that a sound pressure level within the desired range can be obtained, for example.

Also, in the case where the correct speaker ID is not extracted, the transmitter 101-1 or the management server 102 may determine that the transmitter 101-1 is malfunctioning, for example.

Note that in some embodiments, a plurality of the microphone units 607 as illustrated in FIG. 6 may be provided to enable noise level measurement with respect to the plurality of different directions in which sound waves are output by the plurality of speakers. By measuring the noise level with respect to each direction in which a sound wave is output by each speaker, the above-described speaker output level setting process may be implemented with respect to each speaker, for example.

(Position Information Providing Process)

FIG. 18 is a sequence chart illustrating an example sequence of a position information providing process according to the first embodiment.

In step S1801, the user of the information terminal 104 activates the route guidance application 1319 associated with the position information management system 100. Note that the user may activate the route guidance application 1319 at any time before step S1802.

In step S1802, the information terminal 104 receives a beacon including a transmitter ID and a sound wave including a speaker ID that are transmitted from a transmitter 101 located close to the information terminal 104 (e.g., transmitter 101-1). For example, the sound wave acquiring unit 1311 of the information terminal 104 may acquire the sound wave output by the transmitter 101, and the beacon acquiring unit 1312 of the information terminal 104 may acquire the beacon output by the transmitter 101.

In step S1803, the information extracting unit 1313 of the information terminal 104 extracts the speaker ID included in the sound wave acquired by the sound wave acquiring unit 1311, and the transmitter ID included in the beacon acquired by the beacon acquiring unit 1312.

In step S1804, the identification information transmitting unit 1315 of the information terminal 104 transmits a position information acquisition request to the management server 102. The position information acquisition request includes the transmitter ID of the transmitter 101-1 and the speaker ID extracted by information extracting unit 1313 of the information terminal 104, and identification information of the information terminal 104 (e.g., app ID).

In step S1805, the position information management unit 1302 of the management server 102 updates the information terminal position information as illustrated in FIG. 14C, for example, based on the transmitter ID and the speaker ID included in the position information acquisition request received from the information terminal 104.

In step S1806, the position information providing unit 1303 of the management server 102 transmits the position information relating to the information terminal 104 that has been updated in step S1805 to the information terminal 104. The updated position information relating to the information terminal 104 may include information items, such as the "position coordinates" and the "direction" associated with the information terminal 104 in the information terminal position information of FIG. 14C, for example. Note that the position information providing unit 1303 may also transmit the "position description" of FIG. 14A or FIG. 14B that is associated with the above "position coordinates" of the information terminal 104 to the information terminal 104, for example.

Figure 19B:
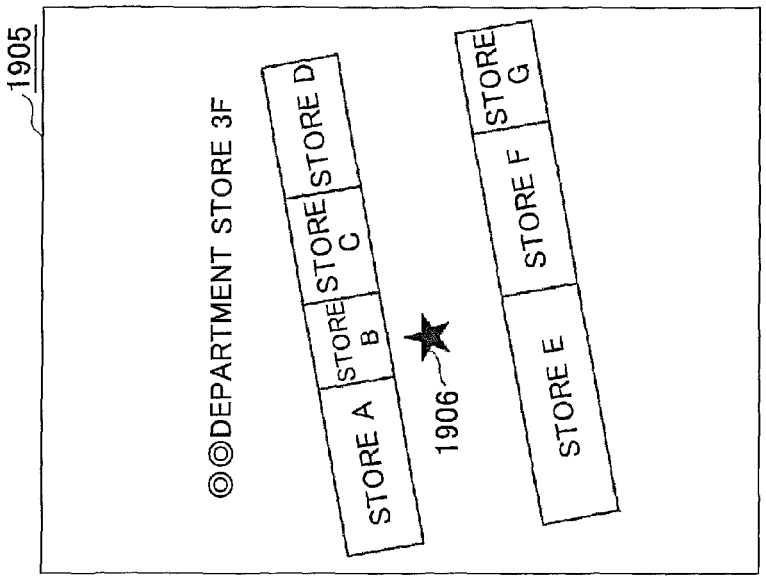
FIGS. 19A and 19B are diagrams illustrating example position information display screens according an embodiment of the present invention.
Figure 19A:
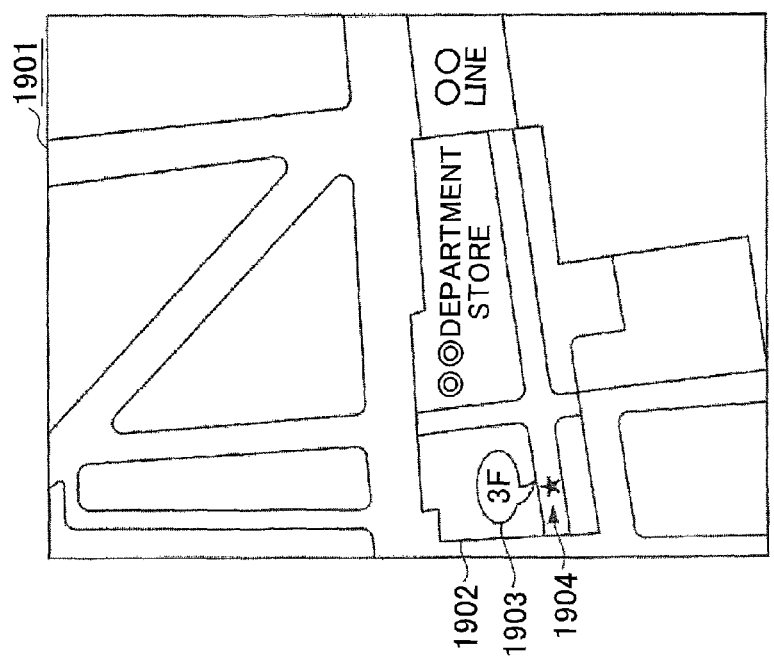

In step S1807, the display control unit 1316 of the information terminal 104 uses the position information of the information terminal 104 received from the management server 102 to control the display/input unit 1009 to display a display screen indicating the position information of the information terminal 104 as illustrated in FIG. 19A or FIG. 19B, for example.

FIGS. 19A and 19B are diagrams illustrating examples of position information display screens according to the first embodiment.

In the position information display screen 1901 illustrated in FIG. 19A, a floor map 1902 of a building that is located at the position coordinates of the information terminal 104 is superposed on a map image being displayed on the display screen 1901. The position information display screen 1901 of FIG. 19A also includes a mark 1904 indicating the position of the information terminal 104 and a bubble 1903 indicating floor information.

Also, in the present embodiment, a more detailed position information display screen as illustrated in FIG. 19B may be displayed based on the beacon and the sound wave output by the transmitter 101-1, for example. The position information display screen 1905 of FIG. 19B indicates a current position 1906 of the information terminal 104 in front of store B.

For example, assuming the upward direction of the display screen 1905 of FIG. 19B corresponds to the northern direction, if the transmitters 101 are arranged at regular intervals along the center of a passage as illustrated in FIG. 19B, it may be difficult to determine whether the information terminal 104 is positioned toward the store B side or the store E (or store F) side of the passage.

However, in the position information management system 100 according to the present embodiment, for example, the position information of the information terminal 104 that is transmitted from the management server 102 to the information terminal 104 in step S1806 of FIG. 18 includes the position coordinates of the transmitter 101-1 as well as information on a corresponding direction of the information terminal 104 with respect to the position coordinates of the transmitter 101. Thus, the information terminal 104 may use the information on the corresponding direction to provide a display screen displaying more detailed position information of the information terminal 104 to the user as compared to a case where only information on the position coordinates of the transmitter 101-1 is available.

As described above, the transmitter 101 according to the present embodiment includes a plurality of speakers that output sound waves including different speaker IDs in a plurality of different directions. In this way, even if restrictions are imposed on the arrangement of the transmitter 101, detailed position information of the information terminal 104 may be provided, for example.

Second Embodiment

In the first embodiment, for example, the transmitter position information of FIG. 14A has information items, such as "direction" and "angle (vertical)" of the speakers registered in advance in association with each transmitter 101. According to a second embodiment of the present invention, the management server 102 acquires information items, such as the "direction (angle)" and "angle (vertical)" of the speakers provided in the transmitter 101-1, for example.

<Hardware Configuration>

Figure 20:
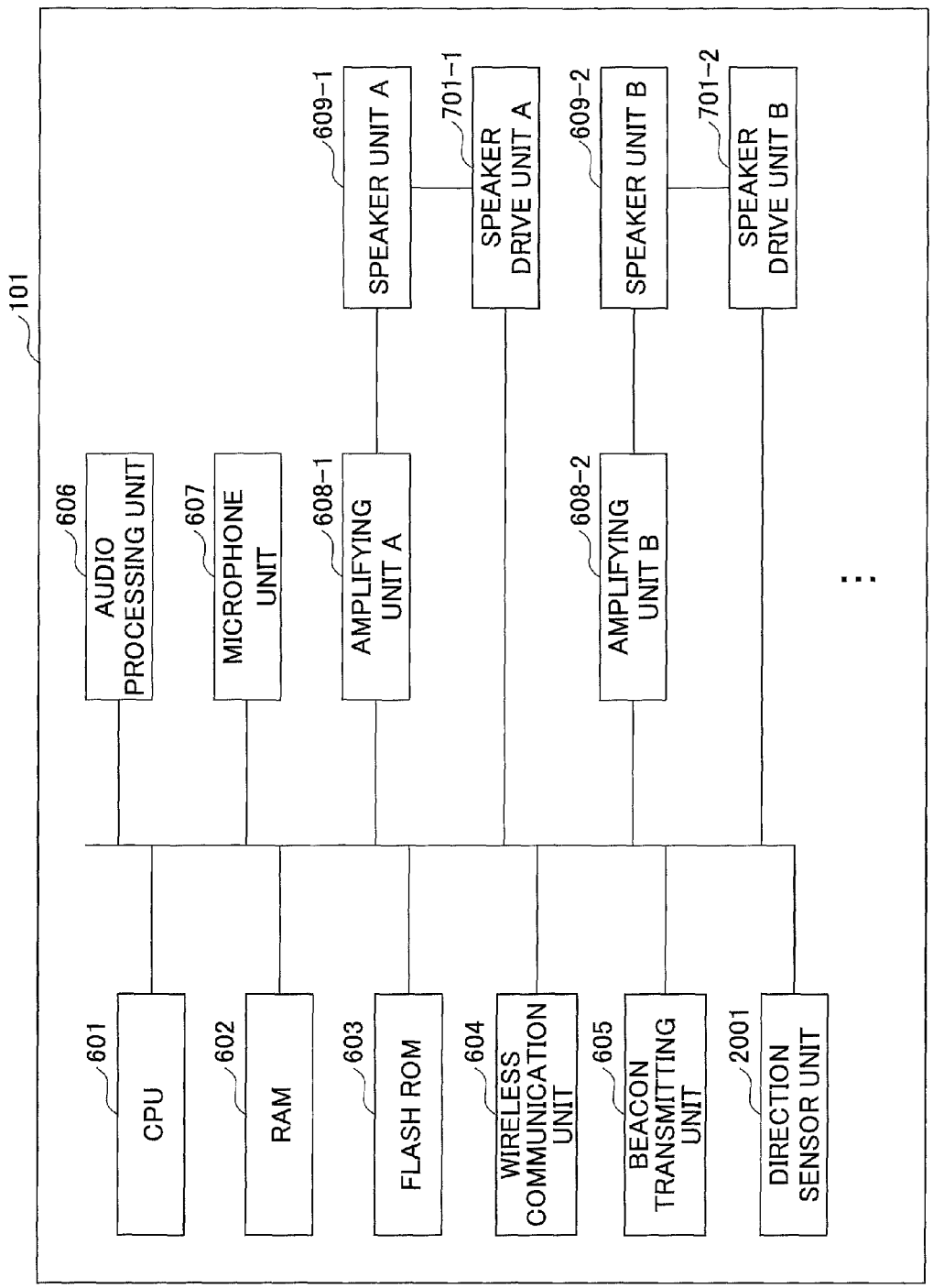
FIG. 20 is a block diagram illustrating another example hardware configuration of the transmitter according to an embodiment of the present invention.

FIG. 20 is a block diagram illustrating an example hardware configuration of the transmitter 101 according to the second embodiment. The transmitter 101 according to the present embodiment includes a direction sensor unit 2001 in addition to the hardware elements of the transmitter 101 illustrated in FIG. 7.

The direction sensor unit 2001 is a direction sensor for detecting a direction (orientation) of the transmitter 101. For example, the direction sensor unit 2001 may detect the direction in which the first speaker is oriented.

Note that the other hardware elements of the transmitter 101 according to the second embodiment may be substantially identical to the hardware elements of the transmitter 101 according to the first embodiment as illustrated in FIG. 7.

<Functional Configuration>

Figure 21:
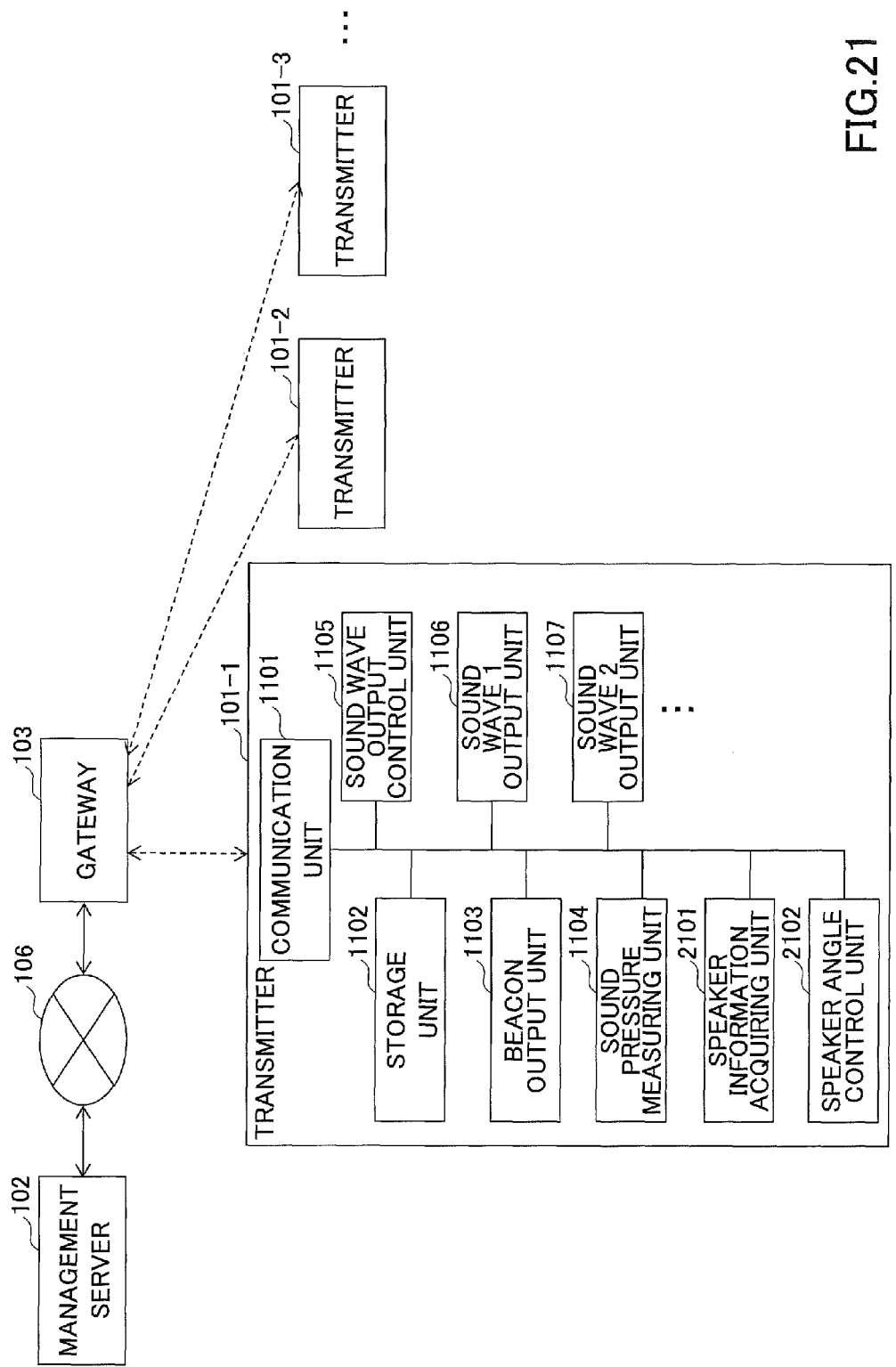
FIG. 21 is a block diagram illustrating another example functional configuration of the transmitter according to an embodiment of the present invention.

FIG. 21 is a block diagram illustrating an example functional configuration of the transmitter 101 according to the second embodiment. In FIG. 21, the transmitter 101 includes a speaker information acquiring unit 2101 and a speaker angle control unit 2102 in addition to the functional elements of the transmitter 101 illustrated in FIG. 12.

The speaker angle control unit 2102 uses the speaker drive unit A 701-1 of FIG. 20 to control (change) the angle of the first speaker in the upward/downward direction. Also, the speaker angle control unit 2102 uses the speaker drive unit B 701-2 to control (change) the angle of the second speaker in the upward/downward direction.

In a preferred embodiment, the speaker angle control unit 2102 stores information on the angle of the first speaker and the angle of the second speaker in the storage unit 1102. The speaker angle control unit 2102 may be implemented by the speaker drive unit A 701-1, the speaker drive unit B 701-2, and a program run on the CPU 601 of FIG. 20, for example.

The speaker information acquiring unit 2101 acquires, from the storage unit 1102 (or the speaker angle control unit 2102), information on the angle in the upward/downward direction of the first speaker and the angle of the second speaker that have been set up by the speaker angle control unit 2102. Also, the speaker information acquiring unit 2101 uses the direction sensor unit 2001 of FIG. 20 to acquire information on the direction in which the first speaker of the transmitter 101 is oriented.

Also, the speaker information acquiring unit 2101 notifies the management server 102 of the acquired information. The speaker information acquiring unit 2101 may be implemented by a program run on the CPU 601 of FIG. 20, for example.

Note that other functional elements of the transmitter according to the second embodiment may be substantially identical to the functional elements of the transmitter 101 according to the first embodiment as illustrated in FIG. 12.

<Process Flow>

Figure 22:
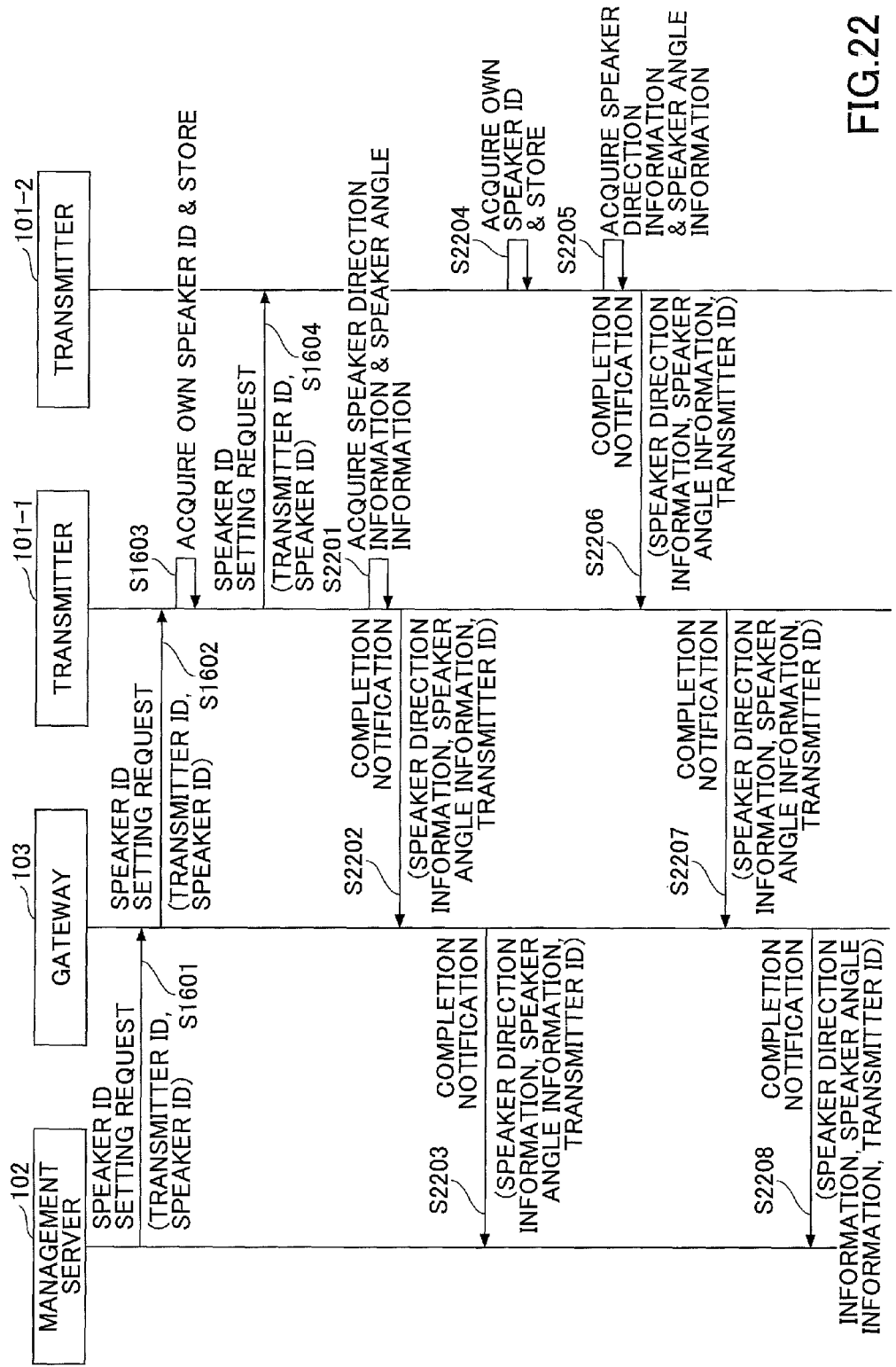
FIG. 22 is a sequence chart illustrating another example sequence of the speaker ID setting process according to an embodiment of the present invention.

FIG. 22 is a sequence chart illustrating an example speaker ID setting process according to the second embodiment. Note that the processes of steps S1601 through S1604 of FIG. 22 are the same as the processes of steps S1601 through S1604 of the speaker ID setting process according to the first embodiment as illustrated in FIG. 16. Thus, in the following, the processes of step S2201 and subsequent process steps are described.

In step S2201, the speaker information acquiring unit 2101 of the transmitter 101-1 acquires, from the storage unit 1102 or the speaker angle control unit 2102, information corresponding to the "angle (vertical)" of each of the speakers (e.g., the first speaker and the second speaker). Also, the speaker information acquiring unit 2101 acquires, from the direction sensor unit 2001, information corresponding to the "direction (angle)" indicating the direction in which the first speaker of the transmitter 101-1 is oriented.

Note that in the present example, the information corresponding to the "direction (angle)" is expressed in terms of an angle formed between a corresponding direction and the northern direction as a reference direction. For example, assuming north is set to "0 degrees" as the reference direction, moving in the clockwise direction, east may be "90 degrees", south may be "180 degrees", and west may be "270 degrees". However, the above angle definition is merely one example, and any form of information that is capable of specifying the direction in which a speaker (e.g., first speaker or second speaker) is oriented may be used to represent the "direction (angle)".

In steps S2202 and S2203, the transmitter 101-1 transmits a completion notification indicating that the speaker IDs have been set up to the management server 102 via the gateway 103. The completion notification may include information items, such as the "direction (angle)" (direction information) and the "angle (vertical)" (angle information) of the speakers acquired in step S2201, and the transmitter ID of the transmitter 101-1, for example.

In this way, the management server 102 may be able to recognize that operations for setting up the speaker IDs at the transmitter 101-1 have been completed and also acquire information items, such as the "angle (vertical)" and the "direction (angle)", of the speakers of the transmitter 101-1.

In step S2204, the transmitter 101-2 acquires the speaker IDs associated with its own transmitter ID from the received speaker ID setting request and stores the acquired speaker IDs.

In step S2205, the speaker information acquiring unit 2101 of the transmitter 101-2 acquires, from the storage unit 1102 or the speaker angle control unit 2102, information on the "angle (vertical)" of the speakers of the transmitter 101-2. Also, the speaker information acquiring unit 2101 acquires, from the direction sensor unit 2001, information on the "direction (angle)" of the speakers of the transmitter 101-2.

In steps S2206 through S2208, the transmitter 101-2 transmits a completion notification indicating that the speaker IDs have been set up to the management server 102 via the gateway 103 and the transmitter 101-1. The completion notification may include information items, such as the "direction (angle)" (direction information) and the "angle (vertical)" (angle information) of the speakers acquired in step S2205, and the transmitter ID of the transmitter 101-2, for example.

In this way, the management server 102 may be able to acquire, from each transmitter 101, information items, such as the "direction (angle)" and the "angle (vertical)" of each speaker. Note that in some embodiments, in order to acquire information from each of the transmitters 101, the management server 102 may be configured to transmit (broadcast) a message such as an information acquisition request to the transmitters 101 instead of the speaker ID setting request as illustrated in FIG. 22, for example.

(Position Information)

FIGS. 23A and 23B are tables illustrating examples of position information managed by the position information management unit 1302 according to the second embodiment.

FIG. 23A illustrates an example of transmitter position information managed by the position information management unit 1302. In the transmitter position information of FIG. 23A, the "direction (angle)" represents information indicating the direction in which each speaker outputs a sound wave, such a direction being calculated based on the "direction (angle)" acquired from each of the transmitters 101.

Note that in the example of FIG. 23A, the information corresponding to the "direction (angle)" is expressed in terms of an angle formed between a corresponding direction and the northern direction as a reference direction. For example, assuming north is set to "0 degrees" as the reference direction, moving in the clockwise direction, east may be "90 degrees", south may be "180 degrees", and west may be "270 degrees".

Also, in the transmitter position information of FIG. 23A, the "angle (vertical)" represents the "angle (vertical)" (angle information) of each speaker acquired from each of the transmitters 101. Such angle information indicates the angle of the output direction of a sound wave output by each speaker with respect to the transmitter 101. For example, assuming the transmitters 101 are arranged on the ceiling of a building, the downward direction may be set to "0 degrees" and the "angle (vertical)" may represent the angle of the speaker with respect to the downward direction. Also, if the position of each speaker can be moved (adjusted) to any one of five different tiers, for example, the "angle (vertical)" may be represented by a value indicating a corresponding tier out of the five different tiers (e.g. 1-5).

In the position information management system 100 according to the present embodiment, the "direction (angle)" and the "angle (vertical)" can be automatically registered, and as such, when installing the transmitter 101, the process of registering the above information may not be required such that the procedure for installing the transmitter 101 may be simplified, for example.

FIG. 23B illustrates an example of information terminal position information managed by the position information management unit 1302 according to the present embodiment. In the information terminal position information of FIG. 23B, the "direction" represents information that is more detailed and accurate as compared with the "direction" included in the information terminal position information according to the first embodiment as illustrated in FIG. 14C. That is, the "direction" included in the information terminal position information of FIG. 140 merely indicates a general direction, such as "north" or "south". On the other hand, the "direction" included in the information terminal position information of FIG. 23B indicates a specific angle, such as "180.5°" or "7.5°", for example. Thus, when the first speaker of the transmitter 101 is arranged to face the north-northeastern direction, for example, the management server 102 according to the present embodiment may be able to provide more detailed and accurate position information as compared with the first embodiment.

Third Embodiment

In the above-described first and second embodiments of the present invention, the management server 102 is configured to manage position information based on a beacon including a transmitter ID and a plurality of sound waves including speaker IDs that are output by the transmitter 101. According to a third embodiment of the present invention, the management server 102 is configured to manage position information based on a plurality of sound waves including speaker IDs of a plurality of speakers that are output by the transmitter 101.

For example, the information terminal 104 may not necessarily include the beacon receiving unit 1006. However, because a typical smart phone includes a microphone, for example, if the information terminal 104 is a smart phone, the information terminal 104 may use the microphone unit 1007 to acquire a sound wave output by the transmitter 101. Thus, as in the present embodiment, the management server 102 is desirably capable of providing position information to the information terminal 104 based on a speaker ID acquired by the information terminal 104.

(Plurality of Regions)

Figure 24A:
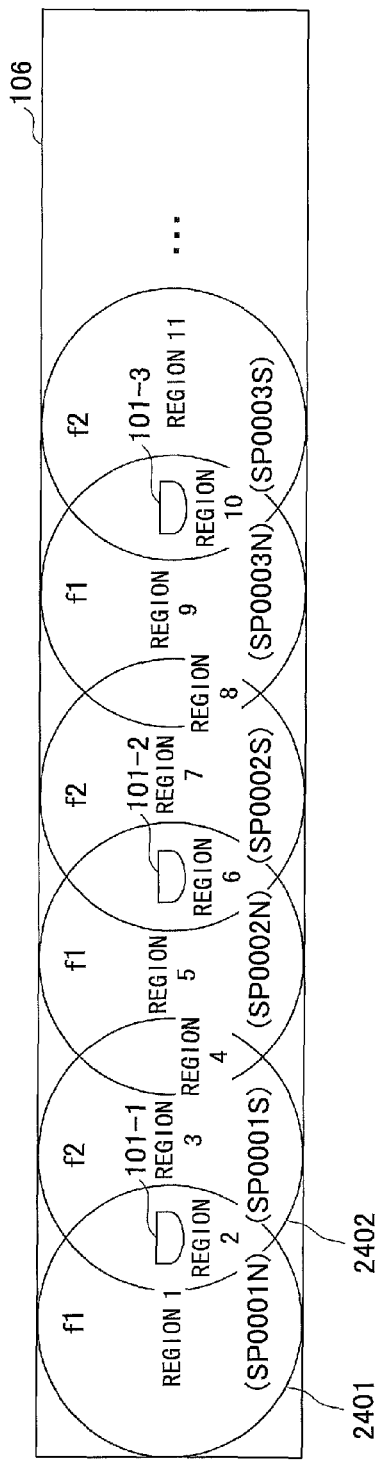
FIGS. 24A and 24B are diagrams illustrating other example arrangements of a plurality of regions according to an embodiment of the present invention.
Figure 24B:
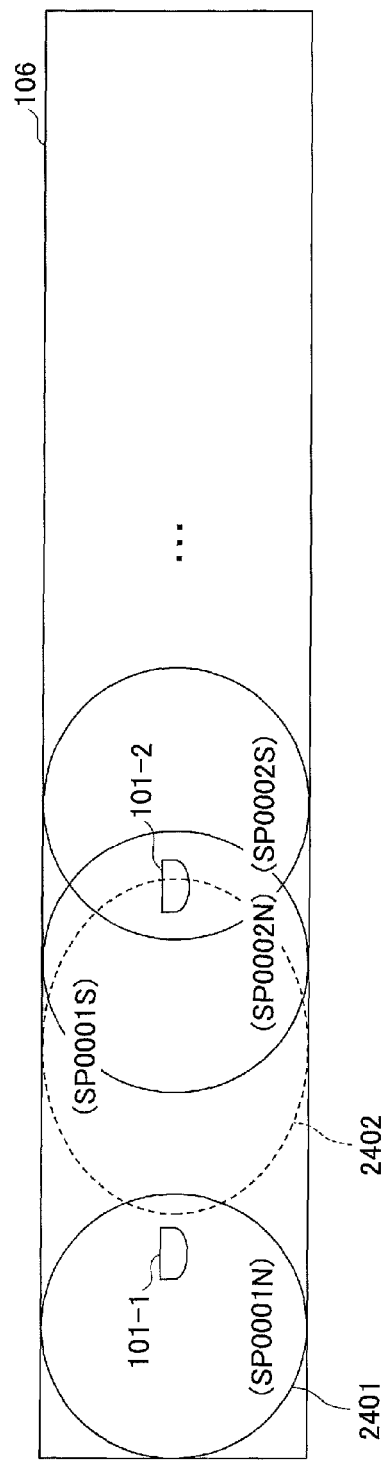

FIGS. 24A and 24B are diagrams showing example arrangements of a plurality of regions according to the third embodiment. In the example of FIG. 24A, a plurality of transmitters 101-1, 101-2, and 101-3 are arranged on the ceiling of the building 107. Note that in FIG. 24A, it is assumed that the left side of FIG. 24A corresponds to the northern direction. Also, in FIG. 24A, it is assumed that the first speaker of each transmitter 101 is arranged to face north.

In the example of FIG. 24A, it is assumed that the sound wave 1 output unit 1106 of the transmitter 101-1 uses the first speaker to output a sound wave including the speaker ID "SP0001N" to a region 2401 at a first frequency f1 (e.g., 16 kHz). Also, it is assumed that the sound wave 2 output unit 1107 of the transmitter 101-1 uses the second speaker to output a sound wave including the speaker ID "SP0001S" to a region 2402 at a second frequency f2 (e.g. 19 kHz). Further, in the example of FIG. 24A, the angles (in the upward/downward direction) of the speakers (first speaker and second speaker) of the transmitter 101-1 are set up such that the region 2401 and the region 2402 at least partially overlap.

Note that outputting a sound wave including the speaker ID "SP0001N" at the first frequency f1 may mean including the sound wave with the speaker ID "SP0001N" in sound waves of a predetermined frequency band (e.g. 5 kHz) having the first frequency f1 (e.g., 16 kHz) as the center frequency, for example. In the example of FIG. 24A, the center frequency of the first sound wave output by the first speaker of the transmitter 101-1, and the center frequency of the second sound wave output by the second speaker of the transmitter 101-1 are different.

Thus, in the example of FIG. 24A, one transmitter 101-1 may form three regions, including region 1 where only the speaker ID "SP0001N" can be detected, region 2 where the speaker IDs "SP0001N" and "SP0001S" can be detected, and region 3 where only the speaker ID "SP0001S" can be detected, for example.

Similarly, the transmitter 101-2, may form region 5 where only the speaker ID "SP0002N" can be detected, region 6 where the speaker IDs "SP0002N" and "SP0002S" can be detected, and region 7 where only the speaker ID "SP0002S" can be detected.

Further, the transmitter 101-1 and the transmitter 101-2 form region 4 where the speaker IDs "SP0001S" and "SP0002N" can be detected.

Also, the transmitter 101-3 forms region 9 where only the speaker ID "SP0003N" can be detected, region 10 where the speaker IDs "SP0003N" and "SP0003S" can be detected, and region 11 where only the speaker ID "SP0001S" can be detected.

Further, the transmitter 101-2 and the transmitter 101-3 form region 8 where the speaker IDs "SP0002S" and "SP0003N" can be detected.

Thus, in the example of FIG. 24A, position information of 11 regions may be managed using the three transmitters 101-1 through 101-3. Also, in the regions where two sound waves overlap, the information terminal 104 may be able to easily acquire the two speaker IDs included in the two sound waves because the center frequencies of the two sound waves are different.

FIGS. 25A and 25B are tables illustrating examples of position information managed by the position information management unit 1302 according to the third embodiment. FIG. 25A illustrates an example of region information indicating the speaker ID(s) to be extracted at each of the regions (regions 1 through 11) illustrated in FIG. 24A.

As illustrated in FIG. 25B, for example, the region in which the information terminal 104 is located can be easily determined based on the identification information (app ID) of the information terminal 104 and the speaker ID included in the position information acquisition request that is transmitted to the management server 102 from the information terminal 104.

(Speaker Control Process)

In the position information management system 100 according to the present embodiment, the output range of each sound wave output by each transmitter 101 is preferably set to an appropriate range.

For example, FIG. 24B illustrates an example where the region 2402 corresponding to the output range of the sound wave 2 output unit 1107 of the transmitter 101-1 that outputs the sound wave including the speaker ID "SP0001S" is not appropriate.

In the example of FIG. 24B, the angle (in the upward/downward direction) of the second speaker of the transmitter 101-1 may be deviated upward from its appropriate angle, for example, and as a result, the region where region 2401 and region 2402 overlap (corresponding to region 2 of FIG. 24A) is smaller than the example of FIG. 24A. Also, the region where only the speaker ID "SP0002N" of the transmitter 101-2 can be detected (corresponding to region 5 of FIG. 24A) is smaller than the example of FIG. 24A.

Further, in the example of FIG. 24B, due to a high output level of the sound wave output by the sound wave 2 output unit 1107 of the transmitter 101-1, for example, the region 2402 to which the transmitter 101-1 outputs the speaker ID "SP0001S" at the second frequency f2 partially overlaps with the region to which the transmitter 101-2 outputs the speaker ID "SP0002S" at the second frequency f2.

Thus, in the example of FIG. 24B, the angle of the second speaker of the transmitter 101-1 is preferably adjusted (changed) in the downward direction and the output level of the sound wave output by the sound wave 2 output unit 1107 of the transmitter 101-1 is desirably controlled to be lower.

<Process Flow>

Figure 26:
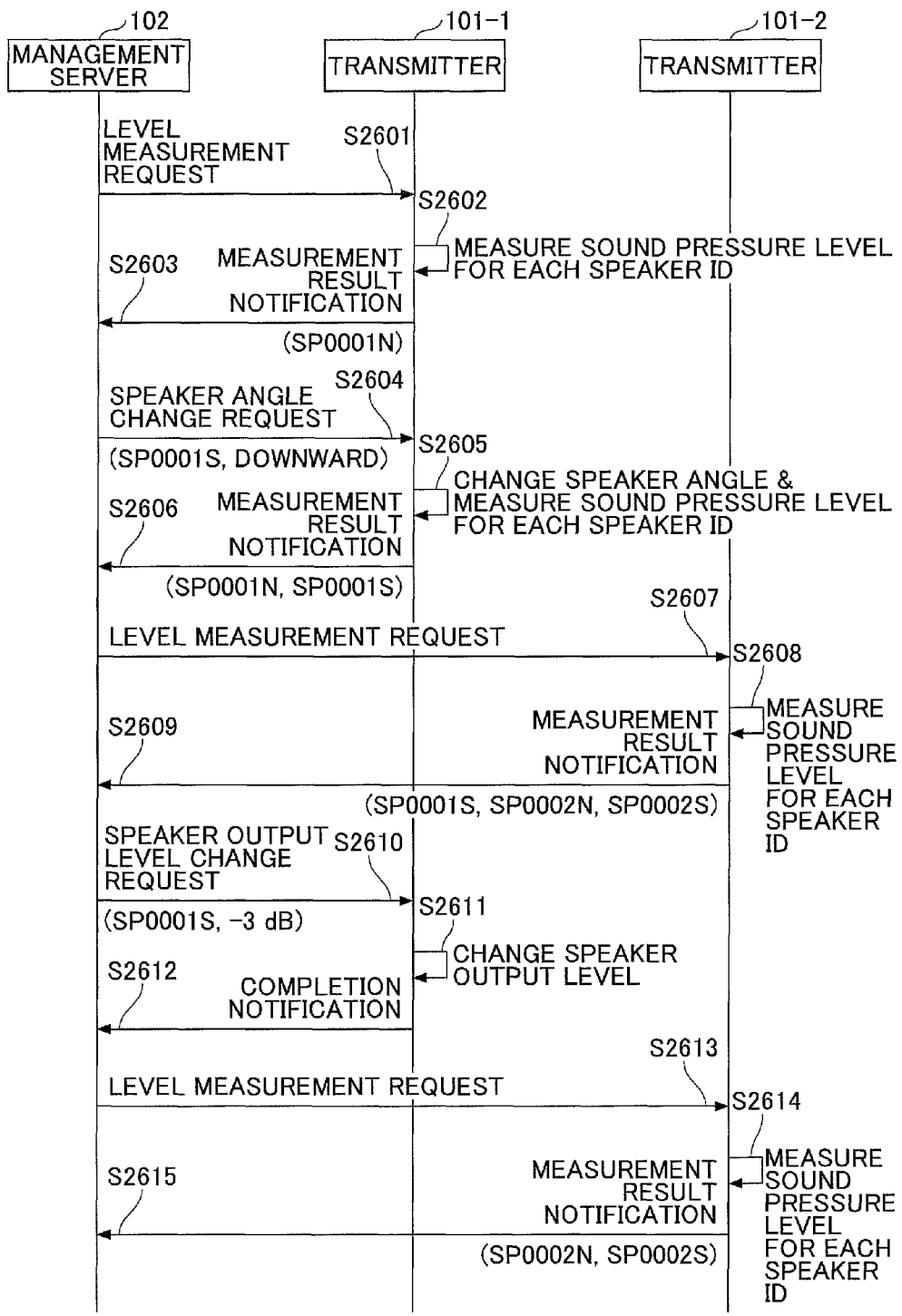
FIG. 26 is a sequence chart illustrating an example sequence of a speaker control process according to an embodiment of the present invention.

FIG. 26 is a sequence chart illustrating an example process sequence of a speaker control process according to the third embodiment.

In step S2601, the speaker control unit 1305 of the management server 102 transmits a level measurement request to the transmitter 101-1, requesting a sound wave output level measurement with respect to each speaker ID.

In step S2602, the sound pressure measuring unit 1104 of the transmitter 101-1 uses the microphone unit 607 to acquire and measure the sound pressure level of each sound wave including a speaker ID.

In step S2603, the sound pressure measuring unit 1104 of the transmitter 101-1 notifies the management server 102 of the sound pressure level measurement for each speaker ID obtained in step S2602. Note that in the example of FIG. 24B, only the sound pressure level of the sound wave with the speaker ID "SP0001N" is measured at the transmitter 101-1, and as such, only the sound pressure level measurement for the speaker ID "SP0001N" is transmitted to the management server 102.

In step S2604, the speaker control unit 1305 of the management server 102 transmits a speaker angle change request to the transmitter 101-1. That is, because the sound pressure level measurement transmitted from the transmitter 101-1 in step S2603 does not contain a sound pressure level measurement for the speaker ID "SP0002S", the management server 102 transmits the speaker angle change request to the transmitter 101-1 to change the angle of the second speaker of the transmitter 101-1. The speaker angle change request may include the speaker ID "SP0002S" for identifying the second speaker that is to have its angle changed, and information indicating the specific angle adjustment to be made (e.g., one step in the downward direction).

In step S2605, the speaker angle control unit 2102 of the transmitter 101-1 uses the speaker drive unit B 701-2 to adjust the angle of the second speaker with the speaker ID "SP0002S" by lowering the second speaker by one step, for example. Also, the sound pressure measuring unit 1104 of the transmitter 101-1 uses the microphone unit 607 to acquire and measure the sound pressure level of each sound wave including a speaker ID.

Note that if the sound pressure measuring unit 1104 of the transmitter 101-1 cannot measure the sound pressure level of a sound wave including the speaker ID "SP0002S", for example, the processes of steps S2603 through S2605 may be repeated until the sound pressure level of a sound wave including the speaker ID "SP0002S" is measured.

In the following descriptions, it is assumed that the sound pressure measuring unit 1104 of the transmitter 101-1 was able to measure the sound pressure level of a sound wave including the speaker ID "SP0002S" in step S2605.

In step S2606, the sound pressure measuring unit 1104 of the transmitter 101-1 notifies the management server 102 of the sound pressure level measurements obtained in step S2605. Note that the notification transmitted to the management server 102 in this step includes sound pressure level measurements for the speaker IDs "SP0001N" and "SP0001S".

When the speaker control unit 1305 of the management server 102 is able to acquire the sound pressure level measurements for the speaker IDs "SP0001N" and "SP0001S", for example, the speaker angle adjustment process with respect to the transmitter 101-1 may be ended, and the processes of step S2607 and subsequent steps may be executed.

In step S2607, the speaker control unit 1305 of the management server 102 transmits a level measurement request to the transmitter 101-2, to request a sound wave output level measurement with respect to each speaker ID.

In step S2608, the sound pressure measuring unit 1104 of the transmitter 101-2 uses the microphone unit 607 to acquire and measure the sound pressure level of each sound wave including a speaker ID. Note that at this time, the transmitter 101-2 may be configured to temporarily stop outputting sound waves from the transmitter 101-2 so that the sound pressure measuring unit 1104 may be able to measure the sound pressure level of a sound wave output by an adjacent transmitter 101 (e.g., the transmitter 101-1), for example.

In step S2609, the sound pressure measuring unit 1104 of the transmitter 101-2 notifies the management server 102 of the sound pressure level measurements obtained in step S2608. Note that in the example of FIG. 24B, sound pressure level measurements for the speaker IDs "SP0002N", "SP0002S", and "SP0001S" can be obtained at the transmitter 101-2. In this case, the notification transmitted to the management server 102 includes the sound pressure level measurements for the speaker IDs "SP0002N", "SP0002S", and "SP0001S".

In step S2610, the speaker control unit 1305 of the management server 102 may determine that the output level of the second speaker of the transmitter 101-1 is too high, for example, and transmit a speaker output level change request for changing the output level of the second speaker to the transmitter 101-1. The speaker output level change request may include the speaker ID "SP0001S" of the second speaker and information indicating a specific change to be made to the output level of the second speaker (e.g., −3 dB).

In step S2611, the sound wave output control unit 1105 of the transmitter 101-1 implements the change (e.g. −3 dB) to the output level of the sound wave output from the second speaker by the sound wave 2 output unit 1107.

In step S2612, sound wave output control unit 1105 of the transmitter 101-1 notifies the management server 102 that the speaker output level adjustment as requested has been completed.

In step S2613, the speaker control unit 1305 of the management server 102 transmits a speaker output level measurement request to the transmitter 101-2, requesting a sound pressure level measurement for each sound wave including a speaker ID.

In step S2614, the sound pressure measuring unit 1104 of the transmitter 101-2 uses the microphone unit 607 to acquire and measure the sound pressure level of each sound wave including a speaker ID.

In step S2615, the sound pressure measuring unit 1104 of the transmitter 101-2 notifies the management server 102 of the sound pressure level measurements obtained in step S2614. In the example of FIG. 26, the notification transmitted to the management server 102 includes sound pressure level measurements for the speaker IDs "SP0002N" and "SP0002S". In this case, the speaker control unit 1305 of the management server 102 may determine that the speaker output level of the transmitter 101-2 is appropriate and thereby end the speaker control process, for example.

On the other hand, if the notification transmitted to the management server 102 in step S2615 contains a sound pressure level measurement for the speaker ID "SP0001S", for example, the speaker control unit 1305 may repeat the processes of steps S2610 through S2615 until the notification transmitted to the management server 102 in step S2615 no longer includes the sound pressure level measurement for the speaker ID "SP0001S".

Note that the speaker control process of FIG. 26 is merely one example of a process implemented by the speaker control unit 1305 of the management server 102. In other examples, the speaker control unit 1305 may perform a control process for changing the frequency of a sound wave output by the transmitter 101 based on a frequency measurement of the sound wave output by the transmitter 101 measured by the sound pressure measuring unit 1104 of the transmitter 101.

Fourth Embodiment

In the above-described first embodiment of the present invention, the position information management system 100 is configured to display position information of the information terminal 104 on the information terminal 104. According to a fourth embodiment of the present invention, route guidance information is provided to the information terminal 104.

Figure 27:
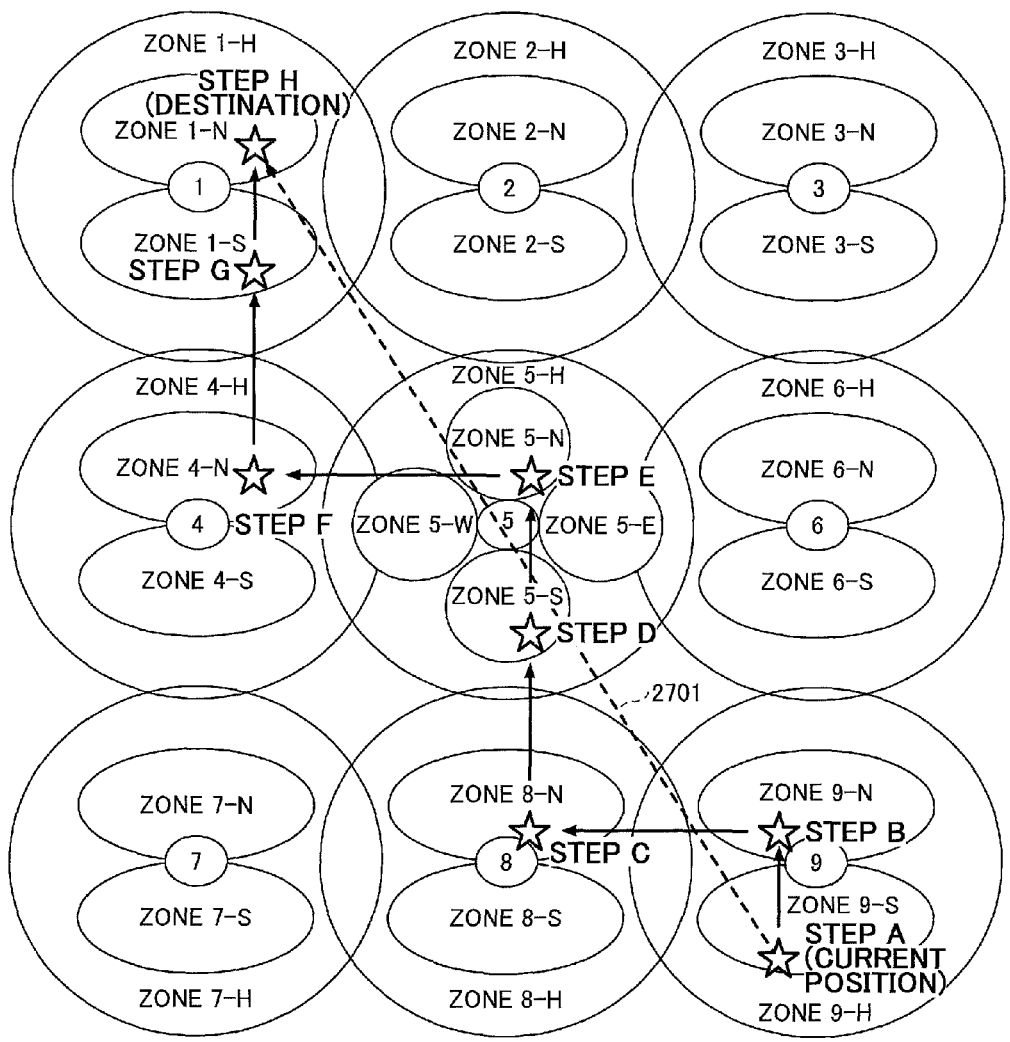
FIG. 27 is a diagram illustrating an example of route guidance according to an embodiment of the present invention.

FIGS. 27 and 28 are diagrams for describing route guidance according to the fourth embodiment. For example, in the following descriptions, it is assumed that a plurality of transmitters 101 (1-9) are arranged to form a plurality of regions as illustrated in FIG. 27.

For example, in FIG. 27, Zone 1-H through Zone 9-H represent regions formed by beacons output by the transmitter 101 (1-9).

Zone 1-N through Zone 9-N represent regions formed by sound waves output by north-facing speakers (first speakers) of the transmitters 101 (1-9).

Zone 1-S through Zone 9-S represent regions formed by sound waves output by south-facing speakers (second speakers) of the transmitters 101 (1-9).

Also, Zone 5-E represents a region formed by a sound wave output by an east-facing speaker (third speaker) of the transmitter 101 (5). Further, Zone 5-W represents a region formed by a sound wave output by a west-facing speaker (fourth speaker) of the transmitter 101 (5).

Also, in the present example, it is assumed that the information terminal 104 has map information 1320 as illustrated in FIG. 27 stored in advance in the storage unit 1318.

FIG. 28 represents an example process flow of a route guidance process according to the fourth embodiment.

For example, in the following, a case where the user 105 that located in "Zone 9-S" starts the route guidance application 1319 (hereinafter referred to as "route guidance app") and sets up "Zone 1-N" as the destination will be described.

In this example, the route guidance app performs route guidance for guiding the user 105 through a route across the regions formed by the sound waves (hereinafter referred to as "zones") that is as close as possible to a straight line connecting the current position and the destination.

In step A, based on the map information 1320, the route guidance app of the information terminal 104 guides the user 105 toward the adjacent zone "Zone 9-N" that is closer to the destination "Zone 1-N" than the current position "Zone 9-S". For example, the route guidance app may display information indicating "north" as the traveling direction on the display/input unit 1009 of the information terminal 104.

In step B, when the user 105 of the information terminal 104 reaches "Zone 9-N", the route guidance app of the information terminal 104 guides the user 105 toward the adjacent zone "Zone 8-N" that is closer to the destination, based on the map information 1320. For example, the route guidance app may display information indicating "west" as the travelling direction on the display/input unit 1009 of the information terminal 104.

In step C, when the user 105 of the information terminal 104 reaches "Zone 8-N", the route guidance app of the information terminal 104 guides the user 105 toward the adjacent zone "Zone 5-S" that is closer to the destination. For example, the route guidance app may display information indicating "north" as the travelling direction on the display/input unit 1009 of the information terminal 104.

In step D, when the user 105 of the information terminal 104 reaches "Zone 5-S", the route guidance app of the information terminal 104 may guide the user 105 toward the adjacent zone "Zone 5-N" that is closer to the destination. For example, the route guidance app may display information indicating "north" as the travelling direction on the display/input unit 1009 of the information terminal 104. Note that at this time, the route guidance app may alternatively guide the user 105 toward the adjacent zone "Zone 5-W" that is closer to the destination in a manner similar to the case of guiding the user 105 toward "Zone 5-N".

In step E, when the user 105 of the information terminal 104 reaches "Zone 5-N", the route guidance app of the information terminal 104 guides the user 105 to the adjacent zone "Zone 4-N" that is closer to the destination, based on the map information 1320. For example, the route guidance app may display information indicating "west" as the travelling direction on the display/input unit 1009 of the information terminal 104.

In step F, when the user 105 of the information terminal 104 reaches "Zone 4-N", the route guidance app of the information terminal 104 guides the user 105 toward the adjacent zone "Zone 1-S" that is closer to the destination, based on the map information 1320. For example, the route guidance app may display information indicating "north" as the travelling direction on the display/input unit 1009 of the information terminal 104.

In step G, when the user 105 of the information terminal 104 reaches "Zone 1-S", the route guidance app of the information terminal 104 guides the user 105 toward the adjacent zone "Zone 1-N" corresponding to where the destination is located, based on the map information 1320. For example, the route guidance app may display information indicating "north" as the travelling direction on the display/input unit 1009 of the information terminal 104.

In step H, when the user 105 of the information terminal 104 reaches "Zone 1-N", the route guidance app of the information terminal 104 displays information indicating that the user 105 has reached the destination on the display/input unit 1009 of the information terminal 104.

In the above example process, detailed route guidance to a destination may be provided to the information terminal 104 even when the information terminal 104 is not capable of receiving a beacon from the transmitter 101, for example.

Note that in the example of FIG. 27, the information terminal 104 may be able to receive a sound wave from a distance of up to approximately 8 m (an average of approximately 5 m), for example. However, the distance from which sound waves can be received may depend on the ambient noise. Note, also, that the information terminal 104 may be able to receive a beacon from a distance of up to approximately 12 m (an average distance of 10 m), for example.

In the above example, the transmitters 101 are preferably arranged at intervals of approximately 5 m to 10 m such that the information terminal 104 may be able to receive a plurality of beacons, for example. However, this is merely one example, and the transmitters 101 may be arranged at intervals of some other distance as long as a beacon transmitted from a transmitter 101 may be received by the information terminal 104, for example.

Also, in some embodiments, the information terminal 104 may be configured to indicate its distance from a transmitter 101 based on the intensity of the beacon received from the transmitter 101. For example, the information terminal 104 may indicate the distance from the transmitter 101 as one of three different levels, such as "far", "near", or "immediate". Such indication may provide a rough sense of the distance from the transmitter 101. For example, "far" may mean a distance of at least 10 m, "near" may mean a distance within a few meters, and "immediate" may mean a distance within 1 m.

<Speaker>

In the following, a speaker with a curved surface that may be used as the speakers of the transmitters 101 as illustrated in FIGS. 4A-4C and FIGS. 5A-5C is described.

Figure 29A:
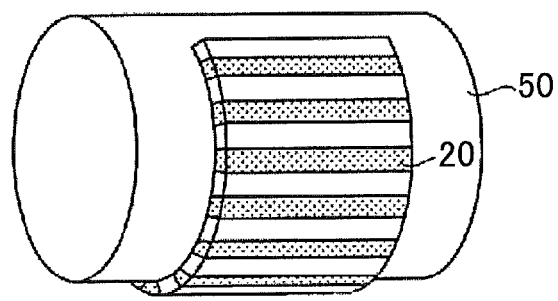
FIGS. 29A-29C are diagrams illustrating an example procedure for manufacturing a speaker according to an embodiment of the present invention.
Figure 29B:
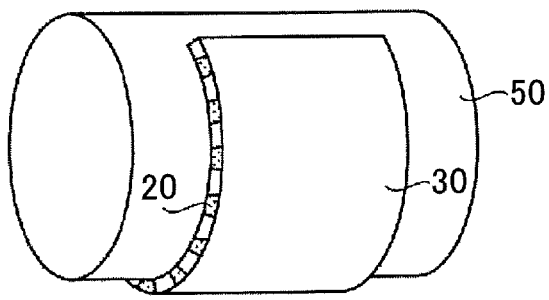
Figure 29C:
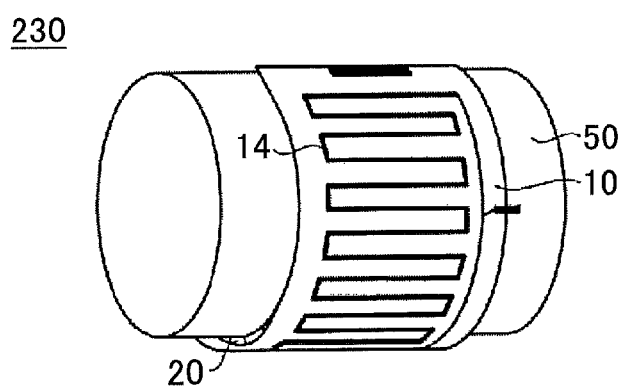

FIGS. 29A-29C are schematic diagrams describing an example procedure for manufacturing a speaker with a curved surface.

To manufacture a speaker 230 as illustrated in FIG. 29C, for example, first, a permanent magnet 20 is wound around an outer peripheral surface of a cylinder 50 as illustrated in FIG. 29A. Note that in some embodiments, a recessed portion corresponding to the thickness of the permanent magnet 20 may be formed along the outer peripheral surface of the cylinder 50 and the permanent magnet 20 may be embedded in the cylinder 50, for example. Then, as illustrated in FIG. 29B, a buffer film 30 is arranged to cover all or a part of the surface of the permanent magnet 20. Then, as illustrated in FIG. 29C, a vibrating plate 10 corresponding to a flexible substrate having a coil 14 formed thereon is arranged on the buffer film 30. By arranging the buffer film 30, adhesion of the vibrating plate 10 and the permanent magnet 20 and divided vibration of the vibrating plate 10 may be suppressed, and an adequate space for enabling vibration of the vibrating plate 10 with sufficient amplitude may be secured, for example.

By arranging the speaker 230 to have a curved surface, the reaching distance of a straight-travelling sound wave output at a frequency of 16 kHz or higher may be extended. For example, such a curved-surface speaker may be used as the speakers 403a and 403b of the transmitter 101 illustrated in FIG. 4.

Figure 30:
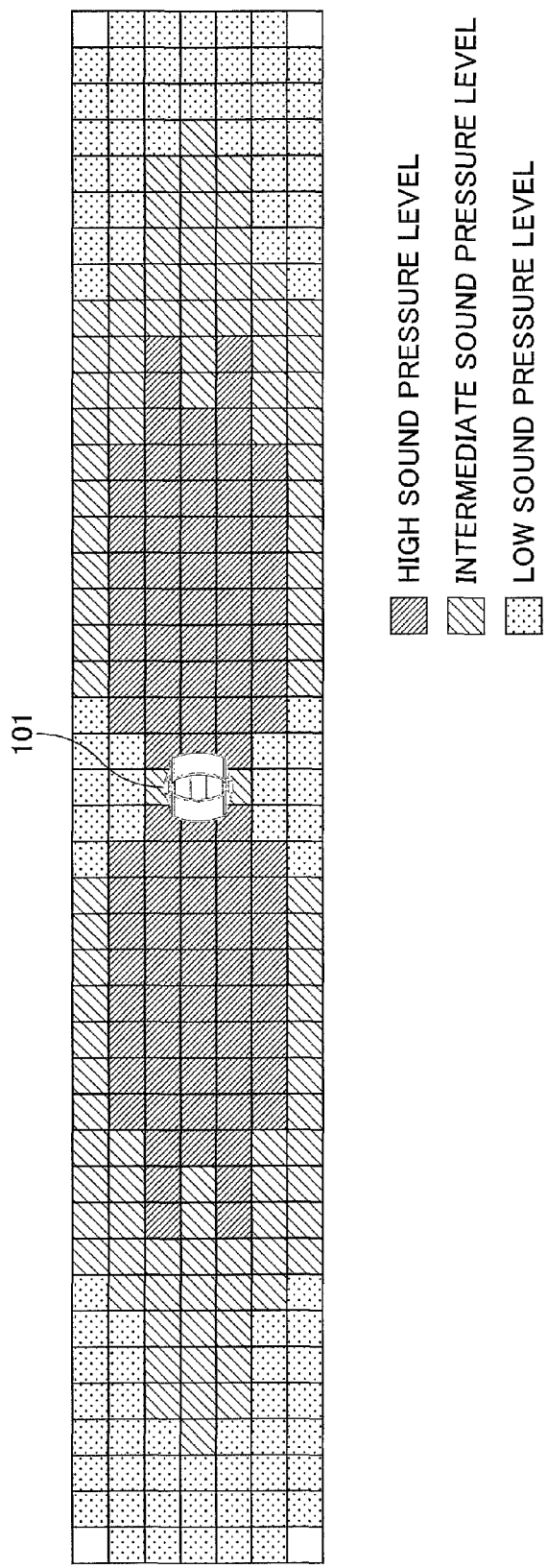
FIG. 30 is a diagram illustrating an example sound pressure level measurement of the transmitter according to an embodiment of the present invention.

FIG. 30 is a diagram representing an example output level measurement of the transmitter 101 according to an embodiment of the present invention. FIG. 30 represents a sound pressure distribution of sound waves output by a prototype of the transmitter 101 as illustrated in FIG. 4. The transmitter 101 was arranged on a ceiling with a height of 5 m, and the speaker bases 402a and 402b were arranged at 45-degree angles with respect to the main base 401. Note that the main base 401 of the transmitter 101 was attached to the ceiling with the sound collection hole 404 (see FIG. 4B) facing downward when the output level of the transmitter 101 was measured.

As can be appreciated from FIG. 30, two regions with high sound pressure levels were respectively formed on the left side and the right side of the transmitter 101.

According to one embodiment of the present invention, a transmitter (101) is provided that is capable of communicating with a management apparatus (102) via a network (106) and is configured to output a plurality of sound waves in a plurality of different directions. The transmitter (101) includes a first sound wave output unit (403a, 503a) configured to output a sound wave including first unique information in a first output direction of the plurality of directions, a second sound wave output unit (403b, 503b) configured to output a sound wave including second unique information that differs from the first unique information in a second output direction that differs from the first output direction, and a sound wave control unit (1105) that is capable of individually controlling the sound wave output by the first sound wave output unit (403a, 503a) and the sound wave output by the second sound wave output unit (403b, 503b) based on a request from the management apparatus (102).

With the above configuration, the transmitter (101) may be able to easily provide detailed position information even in a case where restrictions are imposed on the arrangement of the transmitter (101) that outputs information including position information.

Note that the reference numerals indicated above in parentheses are merely examples and are not intended to limit the scope of the present invention.

Although the present invention has been described above with reference to illustrative embodiments, the present invention is not limited to these embodiments, and numerous variations and modifications may be made without departing from the scope of the present invention.

What is claimed is:

1. A position information management system comprising:
    a transmitter configured to output a plurality of sound waves in a plurality of different directions; and
    a management apparatus that is capable of communicating with the transmitter via a network;
    wherein the transmitter includes
        a first memory storing a first program; and
        a first processor configured to execute the first program to implement processes of
            outputting a first sound wave including first unique information in a first output direction of the plurality of different directions;
            outputting a second sound wave including second unique information that differs from the first unique information in a second output direction that differs from the first output direction; and
            individually controlling the first sound wave output by a first sound wave output unit and the second sound wave output by a second sound wave output unit based on a request from the management apparatus; and
    wherein the management apparatus includes
        a second memory storing a second program; and
        a second processor configured to execute the second program to implement a process of managing information relating to an installation position of the transmitter, and information relating to the first output direction of the first sound wave output by the first sound wave output unit and the second output direction of the second sound wave output by the second sound wave output unit.

2. The position information management system according to claim 1, wherein
    the first unique information is identification information for identifying the first sound wave output unit; and
    the second unique information is identification information for identifying the second sound wave output unit.

3. The position information management system according to claim 1, wherein
    the first processor further implements a process of changing at least one of output of the first sound wave output by the first sound wave output unit and output of the second sound wave output by the second sound wave output unit based on a request from the management apparatus.

4. The position information management system according to claim 1, wherein
    the first processor further implements a process of measuring an ambient sound wave around the transmitter.

5. The position information management system according to claim 4, wherein
    the first processor further implements processes of measuring a noise level around the transmitter, and notifying the management apparatus of the measured noise level.

6. The position information management system according to claim 4, wherein
    the first processor further implements processes of measuring a volume of a sound wave including unique information based on the unique information included in the sound wave, and notifying the management apparatus of the measured volume of the sound wave.

7. The position information management system according to claim 1, wherein
    a first center frequency of the first sound wave including the first unique information differs from a second center frequency of the second sound wave including the second unique information.

8. The position information management system according to claim 1, wherein
    the first processor further implements a process of outputting a radio wave within a predetermined range, the radio wave including third unique information that is different from the first unique information and the second unique information.

9. The position information management system according to claim 8, wherein
the first processor further implements a process of transmitting the third unique information using a short-range radio wave for short-range wireless communication.

10. The position information management system according to claim 9, wherein
the short-range wireless communication corresponds to Bluetooth Low Energy.

11. The position information management system according to claim 1, wherein
at least one of a first angle formed between the transmitter and the first output direction of the first sound wave output by the first sound wave output unit and a second angle formed between the transmitter and the second output direction of the second sound wave output by the second sound wave output unit is configured to be changeable.

12. The position information management system according to claim 11, wherein
the first processor further implements a process of changing at least one of the first angle and the second angle based on the request from the management apparatus.

13. The position information management system according to claim 1, wherein
the first processor further implements processes of acquiring information relating to a direction in which the transmitter is arranged, and notifying the management apparatus of the acquired information.

14. The position information management system according to claim 1, wherein
the first processor further implements a process of changing at least one of the first unique information and the second unique information based on a request from the management apparatus.

15. The position information management system according to claim 1, further comprising:
a non-transitory computer-readable medium storing a third program to be executed by an information terminal that is capable of communicating with the management apparatus via the network, the third program, when executed, causing the information terminal to implement processes of extracting identification information included in a sound wave output by the transmitter; and transmitting the extracted identification information and own identification information of the information terminal to the management apparatus;

wherein the second processor of the management apparatus further implements a process of providing position information relating to the information terminal to the information terminal based on the extracted identification information and the own identification information received from the information terminal, the position information including information relating to a position of the transmitter and information relating to a direction with respect to the position of the transmitter.

16. A position information management method to be implemented by a position management system including a transmitter configured to output a plurality of sound waves in a plurality of different directions, and a management apparatus that is capable of communicating with the transmitter via a network, the position information management method comprising steps of:

the transmitter outputting a first sound wave including first unique information in a first output direction of the plurality of different directions;

the transmitter outputting a second sound wave including second unique information that differs from the first unique information in a second output direction that differs from the first output direction;

the transmitter individually controlling the first sound wave output by a first sound wave output unit and the second sound wave output by a second sound wave output unit based on a request from the management apparatus; and the management apparatus managing information relating to an installation position of the transmitter, and information relating to the first output direction of the first sound wave output by the first sound wave output unit and the second output direction of the second sound wave output by the second sound wave output unit.

\* \* \* \* \*